(12) United States Patent
Akiyama

(10) Patent No.: US 6,278,426 B1
(45) Date of Patent: *Aug. 21, 2001

(54) LIQUID CRYSTAL DISPLAY APPARATUS

(75) Inventor: Masahiko Akiyama, Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,763

(22) Filed: Feb. 13, 1998

(30) Foreign Application Priority Data

Feb. 13, 1997 (JP) .................................................. 9-028942

(51) Int. Cl.[7] ........................................................... G09G 3/36
(52) U.S. Cl. .............................. 345/87; 345/205; 345/97; 345/90
(58) Field of Search ................................. 345/87, 90, 92, 345/94, 97, 205, 206, 98, 208, 204; 349/38–39, 48

(56) References Cited

U.S. PATENT DOCUMENTS 5,436,742 * 7/1995 Tanaka et al. .......................... 349/25
5,627,557 * 5/1997 Yamaguchi et al. .................... 345/90
5,691,783 * 11/1997 Numao et al. .......................... 349/48
5,926,160 * 7/1999 Furuya ................................... 345/98

FOREIGN PATENT DOCUMENTS 5-142573 * 6/1993 (JP) .

OTHER PUBLICATIONS

SID 82 Digest, 38–39 (1982), Juliana, et al, "Thin–Film Polysilicon Devices . . . For Flat Panel Display Circuitry".

* cited by examiner

Primary Examiner—Richard Hjerpe
Assistant Examiner—Francis Nguyen
(74) Attorney, Agent, or Firm—Anderson, Kill & Olick, P.C.

(57) ABSTRACT

A liquid crystal display apparatus includes a plurality of pixel portions having a switching circuit, and a holding circuit for holding display signal voltage supplied from a signal line. A voltage supply circuit includes a pixel electrode for supplying the voltage held by the holding circuit to a liquid crystal layer. A control circuit is provided for controlling the impedance of the pixel electrode to supply the display signal voltage to the liquid crystal layer for preselected time periods.

10 Claims, 17 Drawing Sheets

LIQUID CRYSTAL DISPLAY APPARATUS

FIELD OF THE INVENTION

The present invention relates to a liquid crystal display apparatus. More particularly, the present invention relates to a liquid crystal display apparatus driven by thin-film transistors.

BACKGROUND OF THE INVENTION

An active matrix liquid crystal display which is driven by a thin film transistor (TFT) is used for a notebook-type personal computer in which the thinness of the display and low power consumption are critical. At present, the TN-type liquid crystal is used for the active matrix liquid crystal display. However, there are some problems. These include its field angle dependence and delayed response to motions. To resolve these problems, various liquid crystal materials and display modes have been studied.

An anti-ferroelectric liquid crystal which does not have a threshold value as a liquid crystal provides a wide field angle because the liquid crystals move within a cell plane. Its spontaneous polarization is able to increase the speed of liquid crystal motion by means of an electromagnetic field control. This is effective in increasing optical response speed and the resulting display performance.

Assume that an anti-ferroelectric liquid crystal is driven by the active matrix technique. When there are many pixels, that is, many scanning lines, the response speed (several tens of microseconds) of the liquid crystal is faster than the time frame cycle. However, compared to the time required for selecting one line, it is slower. As a result, when the TFT is turned on, the liquid crystal is not able to move freely but instead, the liquid crystal molecules try to move by the voltage charged when the TFT is turned off. While this is not a problem for a normal TN-type liquid crystal, a problem was observed for an anti-ferroelectric liquid crystal. That is, anti-ferroelectric liquid crystal molecules move by spontaneous polarization. Electrons, charged to the storage capacitance of the liquid crystal when the TFT is turned on, flow into the liquid crystal side when the TFT is turned off. As a result of this phenomenon the pixel voltage decreases.

Because of this phenomenon, the voltage applied to the liquid crystal decreases, decreasing the contrast and response speed, causing poor display properties. Also, the amount of voltage decrease from the original signal voltage of the pixel is dependent on the response speed of the liquid crystal, the resistivity of a conducting transistor, and writing time. A non-uniform display was observed when temperature distribution from back lighting exists within the screen or when the gate has a large resistivity and the gate pulse width changes due to the distance between the gate and the power supply end. It is understood this is due to the phenomena mentioned above.

This phenomenon was observed for different liquid crystals, besides anti-ferroelectric liquid crystals. Such crystals have a large induction and change the induction levels due to the liquid crystal molecule movement, such as cholesteric liquid crystals and the like.

As described, a problem with the prior art is that the liquid crystal cannot respond completely within the selected time when the matrix is driven. Therefore the display is degraded.

Another problem was observed in the liquid crystal display using, for example, the TN-type liquid crystal and the like, which requires that the drive force be derived from an alternating current frequency source to eliminate flicker (e.g., 60 Hz). Therefore, even when the same display image is kept, the display is driven by alternating current, consuming unnecessary power.

SUMMARY OF THE INVENTION

The object of the present invention is to prevent the degradation of the display and to provide a liquid crystal apparatus which is capable of reducing power consumption.

In a preferred embodiment the present invention includes a liquid crystal display apparatus having a plurality of pixel portions. A plurality of scanning lines are coupled to the pixel portions for supplying scanning signals to the plurality of pixel portions. A first substrate is included having a plurality of signal lines for supplying display signals to the plurality of pixel portions.

Also included is a second substrate facing the first substrate, and a liquid crystal layer arranged between the first substrate and the second substrate. Means are included for applying an electromagnetic field to the liquid crystal layer at positions corresponding to selected pixel portions, wherein each of the pixel portions further includes switching means coupled to the signal lines.

Holding means are included and coupled to the switching means for holding a display signal voltage supplied from the signal line via the switching means. A voltage supply means is coupled to the liquid crystal layer for supplying a voltage corresponding to the display signal voltage held by the holding means. The liquid crystal display apparatus also includes a pixel electrode connected to the output of the voltage supply means. Finally, control means are provided for changing the impedance state of the pixel electrode by controlling the output impedance of the voltage supply means.

The liquid crystal layer is formed of liquid crystal with spontaneous polarization wherein the voltage decreases with just "scanning time".

In another preferred embodiment the control means places the pixel electrode into a low impedance state for a predetermined period of time to supply the display signal to the liquid crystal layer, and then places the pixel electrode into a high impedance state.

According to the apparatus incorporating the principles of the present invention, even after the scanning period is finished, the signal held by the holding means can supply the signal to the pixel electrode. With this configuration, a desired voltage can be applied to the liquid crystal layer for a longer period of time than the scanning period. Therefore, the liquid crystal can respond fast enough to prevent the degradation of contrast, response speed, and resulting degradation of display performance. Also, after supplying the voltage from the pixel electrode, the pixel electrode can be in the high impedance state, thus reducing the power consumption.

In a further embodiment of the present invention, a plurality of voltage supply means can be formed. With this configuration, the pixel electrodes can be switched to control the period during which it is in the low impedance state. By doing this, when the same display image is kept, the liquid crystal can be driven by alternating current without supplying the scanning signal or display signal; thus the power consumption is reduced.

In a further preferred embodiment the liquid crystal display apparatus incorporating the principles of the present invention includes a plurality of pixel portions, and a plurality of scanning lines coupled to the pixel portions for supplying scanning signals to the plurality of pixel portions. A first substrate is included having a plurality of signal lines for supplying display signals to the plurality of pixel portions. A second substrate is provided facing the first substrate.

A liquid crystal layer is arranged between the first substrate and the second substrate. Also included are means for applying an electromagnetic field to the liquid crystal layer at positions corresponding to selected pixel portions, wherein each of the pixel portions further includes a switching element and a first capacitor coupled to the switching element for holding a display signal voltage supplied from the signal line via the switching element.

A first transistor is included having a gate coupled to the first capacitor. A second transistor is included having a gate and having a source or drain coupled to the source or drain of the first transistor. A second capacitor is provided coupled between the gate of the first transistor and the gate of the second transistor. Also included is a pixel electrode coupled to the liquid crystal layer and to one of the sources or drains of the first transistor and the source or drain of the second transistor for supplying the display signal voltage held by the first capacitor. Finally control means are included for controlling the impedance of the pixel electrode.

The first capacitor and second capacitor may be formed independently. The voltage holding function carried out by the first capacitor may be shared between the first and second capacitors.

According to an embodiment of the present invention, the signal display voltage can be supplied to the pixel electrode via the circuit comprising the first transistor and the second transistor, even after the scanning period is over for the signal held in the first capacitor. Therefore, a desired voltage can be applied to the liquid crystal layer longer than the scanning period. Accordingly, the liquid crystal can respond fast enough, preventing degradation of contrast or response speed. Also, as soon as the voltage from the circuit comprising the first transistor and the second transistor is finished with being supplied to the pixel electrode, the first and the second transistors can be turned off. This reduces the power consumption. At this time, the gates of the first and the second transistor are connected to each other via the second capacitor. Therefore, if the turn off voltage is applied to the gate of the second transistor, the first transistor can be turned off as well.

Note that it is ideal for each of the embodiments of the present inventions that "a predetermined period of time" be the time during which the optical transmissivity or index of reflection of the liquid crystal layer is 70% or more of the transmissivity or index of reflection of the liquid crystal layer which is finally determined by the applied voltage to the liquid crystal layer.

BRIEF DESCRIPTION OF THE DRAWINGS

The above and other objects, features, and advantages of the present invention will become more apparent from the following detailed description taken with the accompanying drawings, in which.

DESCRIPTION OF THE PREFERRED EMBODIMENTS

Figure 1:
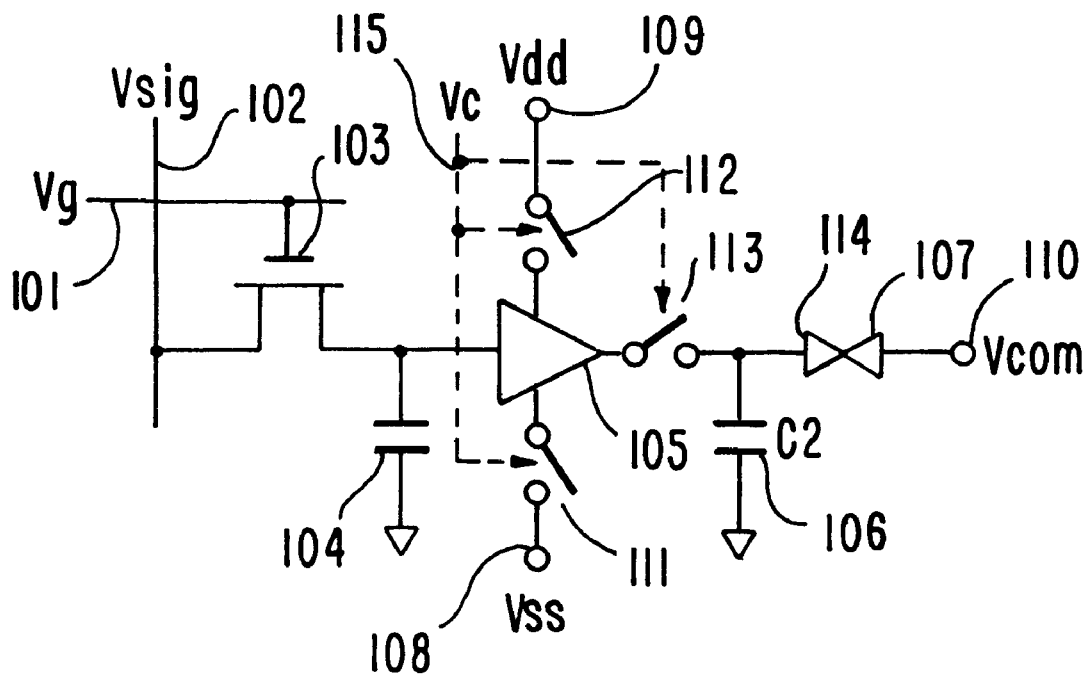
FIG. 1 is a circuit diagram showing Embodiment 1 of the present invention.

Referring to the drawings, FIG. 1 is a diagram showing a configuration of a circuit to a pixel of a liquid crystal display of Embodiment 1.

Connected to a pixel selector transistor 103 are a signal line 102 for supplying signal Vsig, a scanning line 101 for supplying gate voltage Vg which determines whether or not the pixel should be lit, and a holding capacitor 104 which holds the signal voltage. The signal voltage output of transistor 103 is applied to a buffer amplifier 105. The output of buffer 105 is connected to a liquid crystal layer 107 via a pixel electrode 114. Voltage is applied to liquid crystal layer 107 between pixel electrode 114 and a facing electrode 110 (Vcom). In addition, a storage capacitor 106 is connected to pixel electrode 114 to stabilize the voltage supplied to liquid crystal layer 107.

Voltage is supplied from a first power source line 108 (voltage Vss) and a second power source line 109 (Vdd) to buffer 105. Switches 111 and 112 with variable resistivities are provided respectively between power source lines 108 and 109 to buffer 105. A switch 113 is arranged between the output of buffer 105 and pixel electrode 114. Each of these switches is controlled by a signal Vc supplied from a control line 115.

Viewing the configuration as an equivalent circuit, it is acceptable if at least one of the following is formed:

Switches 111 and 112 are set to shut off the power supply to buffer 105, and a single switch 113, which, when open, provides a high resistivity path between buffer 105 and liquid crystal layer 107.

Also, switches 111 through 113 are independent from buffer 105 in the embodiment shown in FIG. 1. However, they can be included in buffer 105. In short, it is acceptable if the circuit is configured such that the conductivity (high-resistivity or low-resistivity state) between the output of buffer 105 and the pixel electrode 114 is controlled.

Next, is described how the circuit shown in FIG. 1 works. Transistor 103 is of the n-channel type. During the pixel selection time period, scanning line 101 maintains a high voltage; signal voltage from signal line 102 charges holding capacitor 104 via transistor 103.

After the pixel selection time period, scanning line 101 maintains a low voltage; transistor 103 becomes highly resistive (nonconductive state) and voltage is retained by holding capacitor 104. Also, switches 111 through 113 are turned on (closed) by control signal Vc for a predetermined time period and the output from buffer 105 is applied to pixel electrode 114. As a result, liquid crystal layer 107 is charged. Liquid crystal molecules move according to the voltage applied to liquid crystal layer 107, varying the transmissivity or index of reflection thereof. This provides a display.

When the crystal molecules almost finish moving, either the switch set 111 and 112 or the switch 113 or both are turned off. (For example, switch 11 (ON)—switch 112 (ON)—switch 113 (OFF) is viable, but switch 111 (OFF)—switch 112 (ON)—switch 113 (ON) is not viable.) The voltage applied to liquid crystal layer 107 is retained by the capacitance inherent to the liquid crystals themselves and storage capacitor 106. At this stage, liquid crystals are moved to be positioned in a specific position determined by the voltage applied thereto. Therefore, liquid crystal molecules are stabilized such that they do not need to move any more. Accordingly, even if the equivalent permittivity (or amount of polarization) greatly changes, the required voltage can be applied independently from the pixel selection period. With an excellent fast response, a high-quality image including contrast can be obtained. In addition, current supplied to the buffer 105 can be stopped. This reduces the power consumption.

Figure 2:
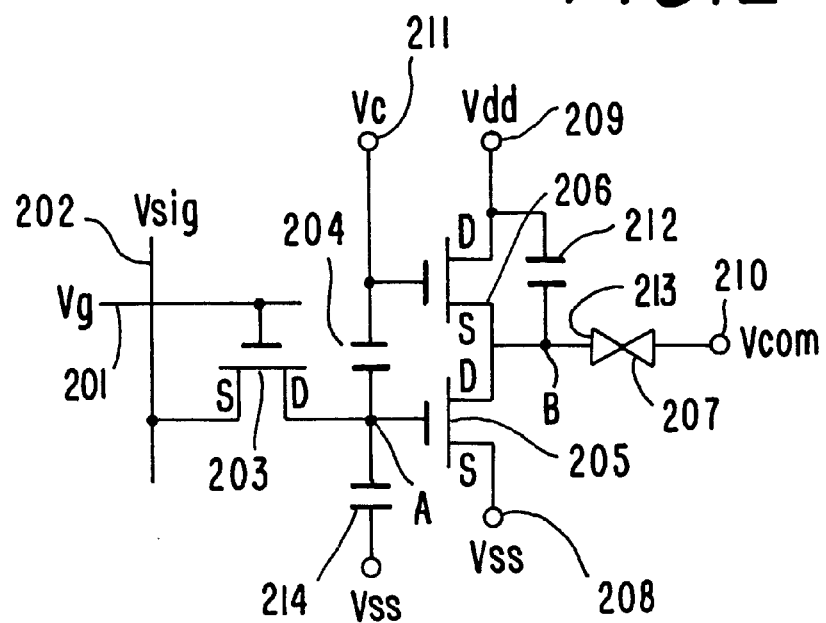
FIG. 2 is a circuit diagram showing Embodiment 2 of the present invention.

FIG. 2 is a circuit diagram showing a unit of pixel construction of a liquid crystal system of Embodiment 2. This has further details of the configuration shown in FIG. 1.

Scanning line 201, signal line 202, and transistor 203 are configured the same as their counterparts in FIG. 1. The output of transistor 203 is connected to holding capacitors 204 and 214. However, holding capacitor 204 is not always required. A buffer circuit is formed by transistors 205 and 206. Holding capacitor 204 is connected between the gates of transistors 205 and 206. Control signal Vc is supplied to the junction between holding capacitor 204 and the gate of transistor 206 via control line 211.

The source of transistor 205 is connected to power source 208 (power source voltage Vss). The drain of transistor 206 is connected to power source 209 (power source voltage Vdd). The drain of transistor 205 and the source of transistor 206 form the output of the buffer circuit which is connected to a pixel electrode 213 such that voltage can be applied to the liquid crystal layer 207 between facing electrode 210 (voltage Vcom) and pixel electrode 213. One electrode of a storage capacitor 212 is connected to pixel electrode 213 and the other electrode is connected to a power source 209 (Vdd). However, the other electrode of capacitor 212 may be connected to a point with a potential which does not fluctuate most of the time during voltage supplied to liquid crystal layer 207.

Next, will be described how the circuit shown in FIG. 2 works. Transistors are assumed to be the n-channel type.

During the pixel selection period (controlled by scanning line 201), Vdd of power source 209 is assumed to be higher than Vss of power source 208. Vc of control line 211 is assumed to be the voltage which turns transistor 206 on. The input voltage of the buffer circuit formed by transistors 205 and 206 is nearly equal to Vsig. If the input voltage of the buffer circuit is set higher than Vss, the resistivity changes between the drain and source of transistor 205. The output voltage from the buffer circuit is determined by the above resistivity between the drain and source of transistor 205, and the resistivity between the drain and source of transistor 206. This output voltage is applied to liquid crystal layer 207 via pixel electrode 213 and to storage capacitor 212.

When the voltage applied to the liquid crystal layer 207 reaches about the predetermined voltage, control signal Vc becomes a low-voltage signal to turn transistor 206 off. At this time, transistor 203 has already been turned off. Therefore, the gate voltage of transistor 205 is lowered through capacitor 204 to turn transistor 205 off.

The change in gate voltage $\Delta Vg$ of transistor 205 is expressed by the following equation (1):

$$\Delta Vg = \Delta Vc \times [C1/(C1+C2+Cgs)] \qquad (1)$$

where

Cgs is the capacitance between the gate and source of transistor 205;

$\Delta Vc$ is the change in control voltage Vc;

C1 is the capacitance value of capacitor 204; and

C2 is the capacitance value of capacitor 214.

Therefore, if $\Delta Vg$ is set smaller than Vss+Vth (Vth is the threshold voltage value of transistor 205), transistor 205 can be turned off.

As described, if capacitor 204 is provided between the gates of transistors 205 and 206, transistors 205 and 206 can be turned off by changing control signal Vc. Therefore, if the power source of the buffer circuit is shut off, the resistivity between the buffer circuit and pixel electrode 213 increases at the same time. Thus the voltage applied to liquid crystal layer 207 and storage capacitor 212 is held to perform the same effects as demonstrated in Embodiment 1 shown in FIG. 1.

Also, this configuration requires that the gates of transistors 205 and 206 have a high voltage for only a predetermined period. The threshold voltage of a thin film transistor using a material such as an amorphous silicon thin-layer fluctuates depending on the gate stress voltage and its applying time. The fluctuation or threshold voltage shift can be minimized by shortening the time when the high voltage is applied to the gate to provide a uniform voltage to the liquid crystal layer for a long time period. A uniform voltage can be supplied for a longer period of time by optimizing voltage states. Moreover, the fluctuation of the threshold voltage, which is generated while transistors 205 and 206 are turned off, can cancel the fluctuation of the threshold voltage generated while transistors 205 and 206 are turned on, because the polarity of the gate-source voltage on each state is inverted. Therefore, a well-designed driving condition (control voltage Vc value and predetermined period) is given that very little fluctuation of Vth.

The relationship between the input voltage and the output voltage can be controlled by changing the ratio $\beta r=\beta 1/\beta 2$ where W1 is the channel width of transistor 205;
L1 is the channel length of transistor 205;
$\beta 1$ is W1/L1;
W2 is the channel width of transistor 206;
L2 is the channel length of transistor 206; and
$\beta 2$ is W2/L2.

The larger the ratio $\beta r$ is, the smaller Vsig is to the voltage applied to the liquid crystal, reducing the power consumption of the signal circuit. The smaller $\beta r$ is, the smaller the rate of fluctuation of the input/output voltage applied to the transistor. Based on the above relationship, the appropriate range of $\beta r$ is 3 to 6. In addition, by changing the Vc value with respect to power source voltage Vdd during the high-voltage state, the input/output properties can be optimized.

Figure 3:
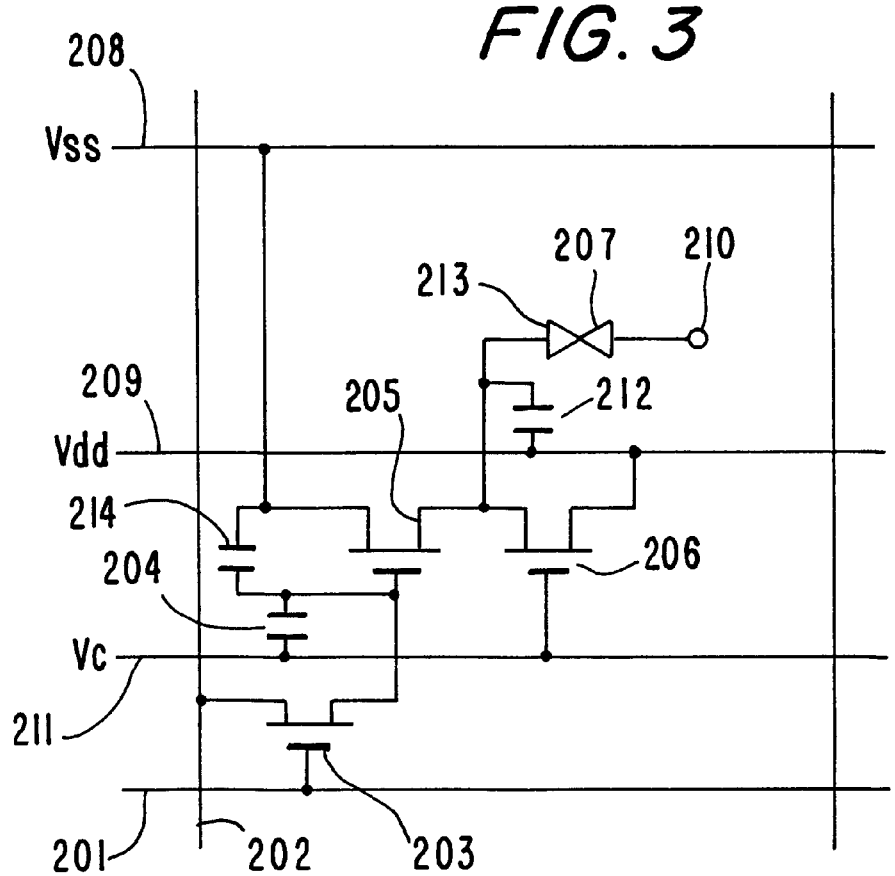
FIG. 3 is a circuit diagram in which the circuit shown in FIG. 2 is extended as a pixel circuit.

FIG. 3 is an example of the circuit shown in FIG. 2 which is extended as a pixel circuit.

In the example shown in FIG. 3, power source voltage Vdd is applied from power source line 209, which is independent, and power source voltage Vss is supplied from a scanning line 208 over the other scanning line. When an active pixel is selected, scanning line 208 over the other scanning line is leveled down; the buffer circuit operates without any problem. In addition, control voltage Vc is supplied from control line 211, which is independent, and is controlled to have a high voltage for a predetermined period of time and otherwise has a low voltage.

When using an amorphous silicon TFT having transistors with a threshold voltage (Vth) of 3V and a signal voltage (Vsig) of 4V to 11V, the pixel voltage was provided with a voltage difference of 3V to 13V where Vdd=20V;
Vss=0V;
Vc (high voltage state)=25V; and
$\beta r=4$.

Also, when facing electrodes are given a voltage of 8V, a screen with little flicker was obtained. The buffer circuit did not demonstrate a linearity of input/output within the above input voltage range. However, when signal voltages were corrected based on its own properties, an excellent display was obtained without any problem.

One may configure the circuit so that the gain of the buffer circuit will provide a signal voltage amplitude of about 1V to 2V and the applied voltage amplitude to the liquid crystal is about 10V. Polysilicon TFT can make it easier to accomplish this goal.

Figure 4:
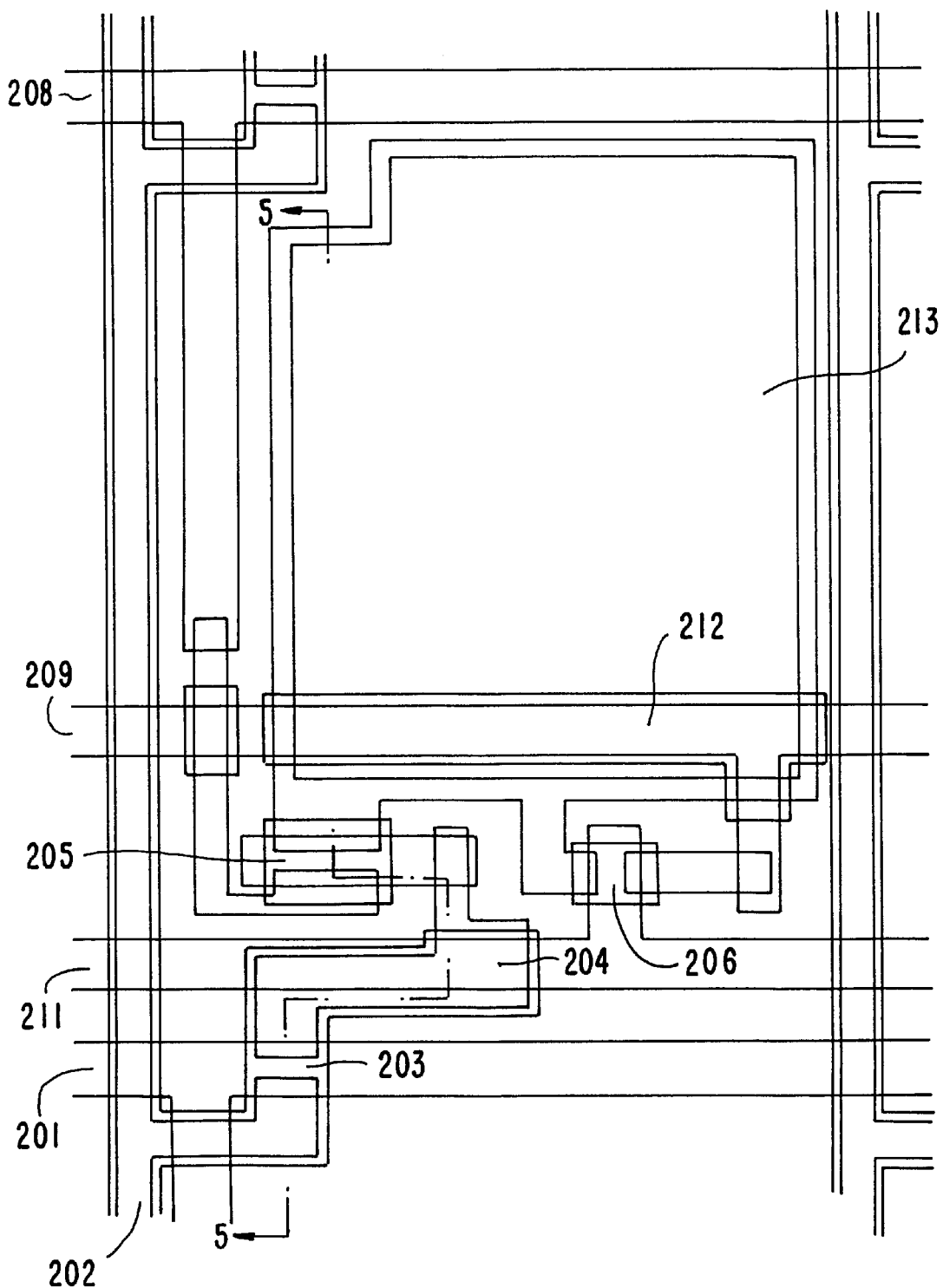
FIG. 4 is a plan view of the circuit shown in FIG. 3 fabricated on a substrate.
Figure 5:
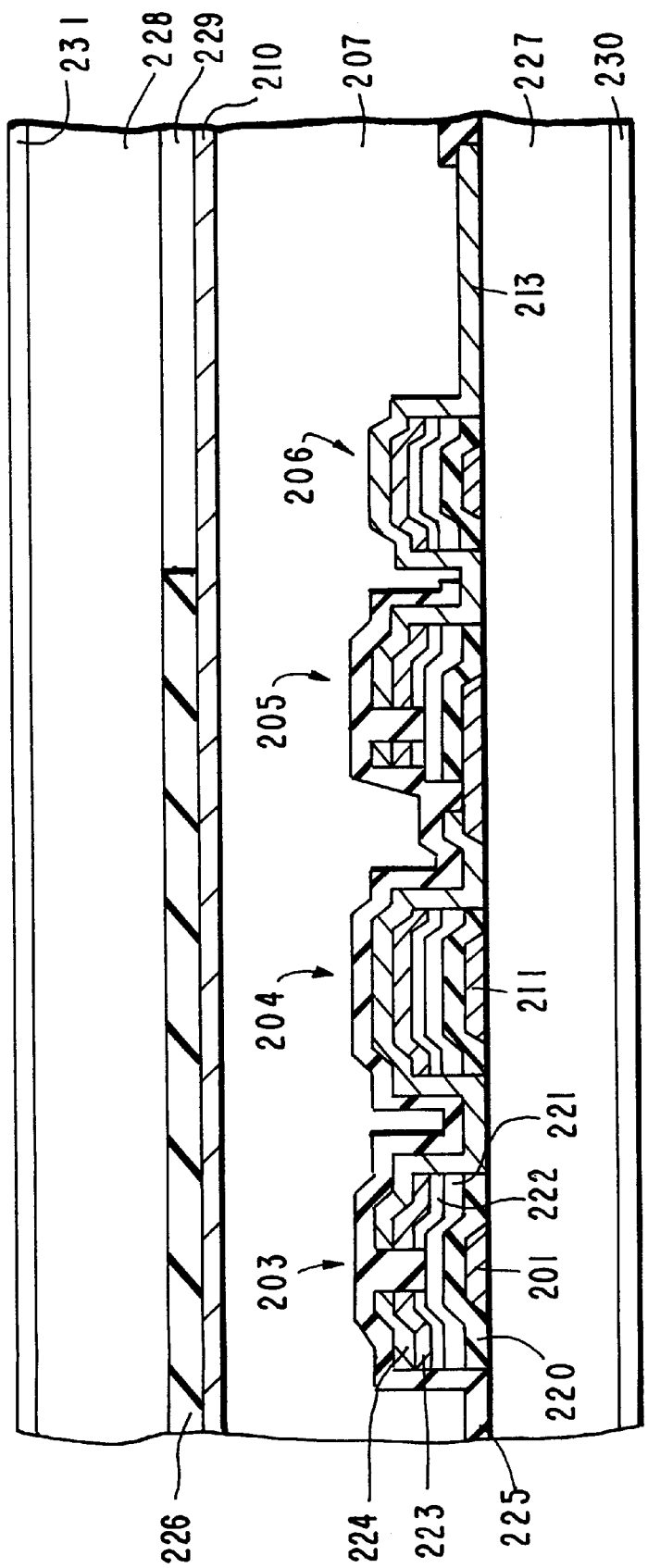
FIG. 5 is a cross-sectional view taken along the line 5—5 of FIG. 4.

FIG. 4 is a plan view of the circuit shown in FIG. 3 fabricated on a substrate. FIG. 5 is a cross-section of FIG. 4 taken along the line 5—5. Holding capacitor 214 shown in FIG. 3 is not illustrated in FIGS. 4 and 5.

The TFT in this embodiment is of the inversely staggered type which is made of amorphous silicon of the channel-etch type. One can use at least three photomasks in its manufacture. In FIG. 5, four photomasks including a pattern having a passivation film are used. The embodiment is described with reference to manufacturing steps herein.

First, a metal such as molybdenum-tantalum (MoTa) alloy is fabricated at 300 nm on a substrate 227 made of glass or plastic. The metal is patterned in a predetermined shape to form a gate electrode (scanning line) 201 and the like.

Next, a silicon oxide ($SiO_x$) film of 350 nm and a silicon nitride ($SiN_x$) film are laminated to form a gate dielectric film 220 by the plasma chemical-vapor deposition (CVD) method. The gate dielectric film 220 can be a $SiN_x$ single layer film or it can be a laminated film of anodic oxide which is made by anodically oxidizing a gate electrode. Then, 150 mm of non-doped amorphous silicon film 221 is deposited on gate dielectric film 220 using the plasma CVD method.

In addition 50 nm of P-doped n-type amorphous silicon film 222 is deposited. For this n-type silicon layer, a P-doped microcrystal silicon film can be used. Then, on the n-type silicon layer 222, metal film 223 for signal lines etc. are deposited by a sputtering method using molybdenum (Mo) or molybdenum-aluminum (Mo/Al). The thickness of metal film 223 is dependent on the resistivity required for a signal line. For example, it is 400 nm for molybdenum.

Resist is applied to the laminated films formed in the above method. A resist pattern is exposed and developed to form a predetermined shape thereon. Using this resist pattern as a mask, metal film/n-type silicon film/non-doped silicon film/gate dielectric film are etched. A dry etching technique using a F-type gas ($CF_4$, etc) is desirable in this case.

Transparent film 224 is formed at 200 nm by the ITO sputtering method. Resist is applied thereon to be exposed and developed to form a predetermined resist pattern. Using the resist pattern as a mask, transparent dielectric film 224 is etched to form patterns for source/drain electrode, signal line, electrode, and pixel electrode patterns on top of holding capacitance and storage capacitance. In addition, using the transparent dielectric film pattern as a mask, metal film 223 and n-type silicon film 222 are etched away.

As described above, a TFT array can be made by means of up to three photomasks. In this example, however, passivation film 225 of $SiN_2$, which is formed by the plasma CVD method, was deposited at 300 nm and the pixel electrode portion and the interconnect pad portion (not illustrated) around the passivation film 225 were patterned.

On the other hand, on facing substrate 228, black matrix 226, which shields the pixel and the top of the TFT, and facing electrode 210 are formed by ITO.

Liquid crystal layer 207 is sealed in the space between the TFT array substrate and the facing substrate. The anti-ferroelectric liquid crystal, whose amount of polarization is 0.2 $\mu C/cm^2$, is injected into the cell. It has no hysteresis. The cell gap (liquid crystal film thickness) is 1.5 to 2 $\mu$m. Note that an orientation film (not illustrated) is fabricated on the TFT array substrate and the facing substrate and is rubbed in a predetermined direction. Polarized plates 230 and 231 are formed outside the TFT array substrate and the facing substrate.

In the above manufacturing method, films with the metal/n-type silicon/non-doped silicon/gate construction are etched away simultaneously. Therefore, the gate electrode (lower electrode), which is not covered by a silicon film, is exposed. With this configuration, the space required for opening a contrast hole can be eliminated, thus improving the aperture ratio.

The TFT can be of the etching-stopper type, which is formed with a channel protection film on the channel. It may be of the self-aligned type, in which the back surface of the channel protection film is exposed by aligning along the gate line. Also, the n-type silicon film may be formed by the CVD or dopant ion implantation method. The TFT may be of the top-gate type in which a gate electrode is formed on top of the silicon layer. It may also be of the planar type. Another process, in which a gate dielectric film is not etched away, may be introduced provided the connection with the lower electrode is etched away in a separate step. An alternate structure may be introduced such that the passivation film and through hole are etched away simultaneously and a pixel electrode is formed on top of the passivation film polysilicon (Poly Si) which may be used for the silicon layer. Other inorganic materials such as silicon-germanium (Si—Ge) and the like may be used in place of silicon. Organic semiconductor materials may also be used.

Another alternate structure may be introduced in that a dielectric film made of an organic resin such as acryl, benzocyclobutane (BCB), polyimid, or an inorganic material may be formed on the TFT array. A pixel electrode, which is formed on the dielectric film, can be connected to the output terminal of the buffer circuit via a through hole. In this configuration, the peaks and valleys of the TFT array can be flattened. This has advantageous effects in producing a liquid crystal cell having a narrow gap such as an AFLC.

Figure 6:
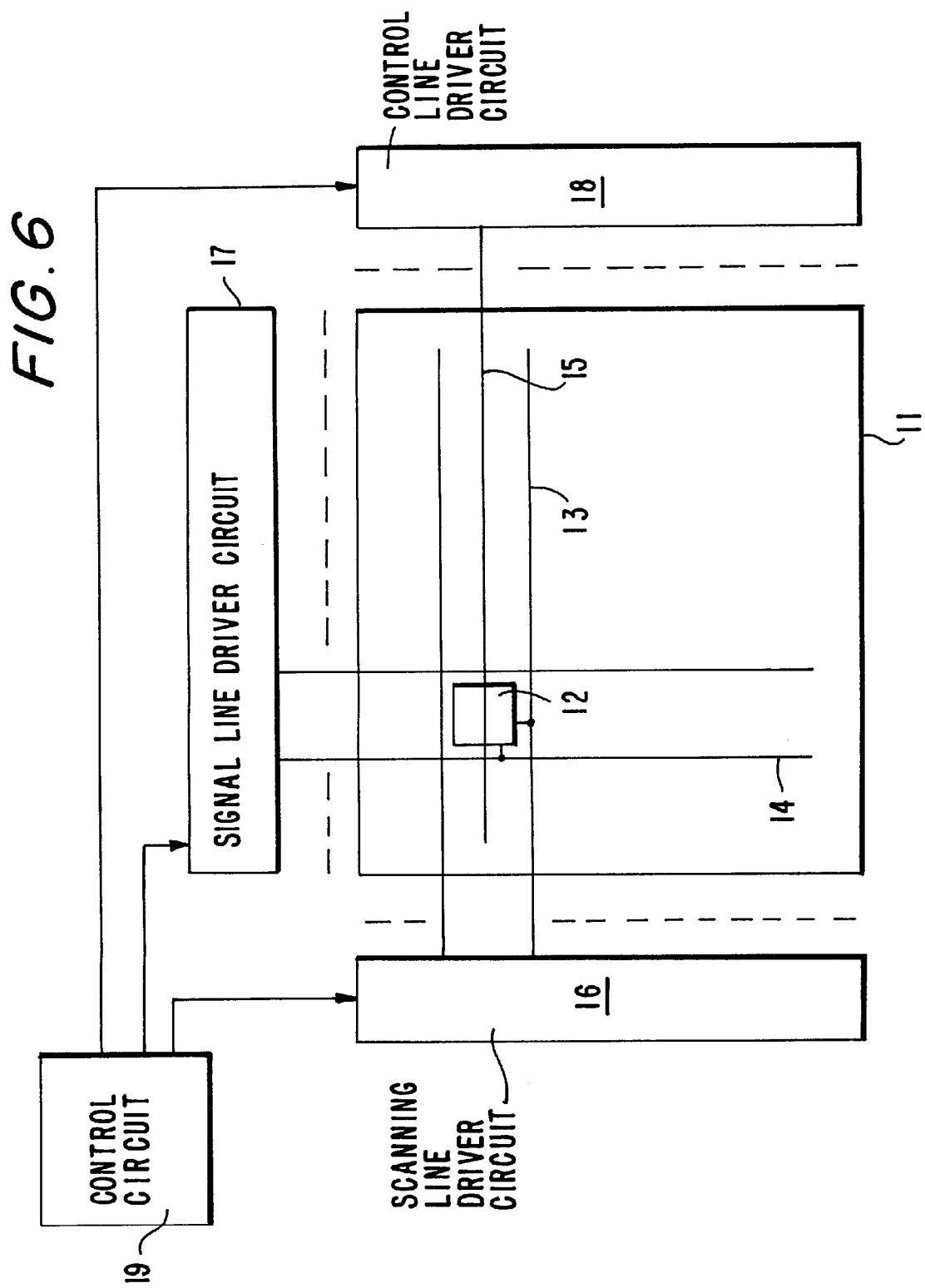
FIG. 6 is a block diagram showing a configuration of a liquid crystal panel and its drive circuit.

FIG. 6 is a block diagram showing a configuration of a liquid crystal panel and its drive circuit and the like. Identified by numeral, 11 is a liquid crystal cell, 12 is a pixel portion, 13 is a signal line, 15 is a control line, 16 is a scanning line driver circuit, 17 is a signal line driver circuit, 18 is a control line driver circuit, and 19 is a control circuit. Actually, a power source line and the like are formed in addition to the above. How they are operated is not described here because it can be understood with reference to the normal line sequence for active matrix driving and the timing chart and the like shown in FIG. 7.

Figure 7:
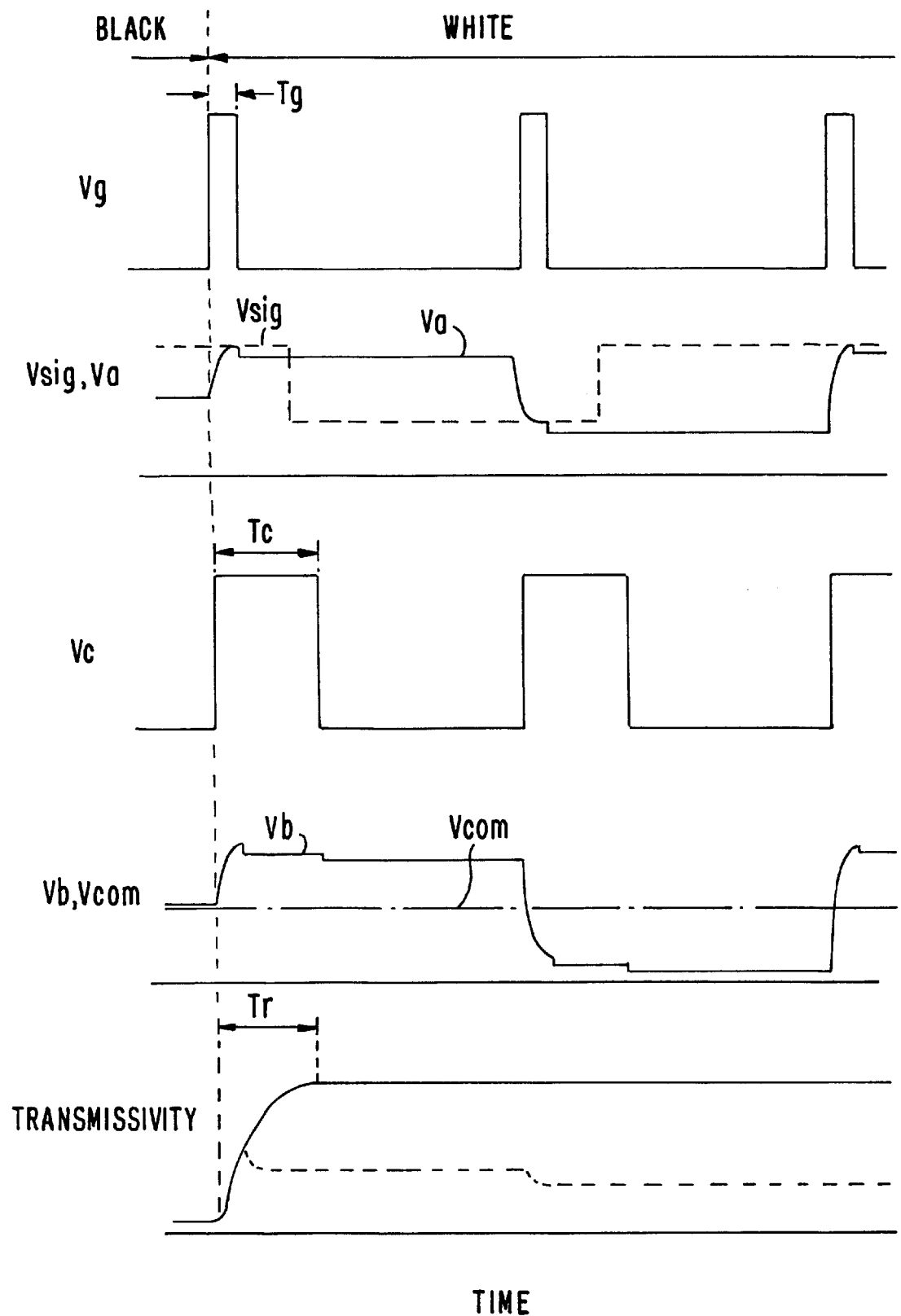
FIG. 7 shows graphical waveforms indicating the change in voltage and optical response (transmissivity) with time.

FIG. 7 shows graphical waveforms indicating the change in voltage and optical response (transmissivity) with time. This example shows the transitional stage in which black indication turns into white indication. With the pulse (scanning line signal), Vg, Va (potential) at point A shown in FIG. 2 changes from the potential corresponding to the black level to the white level. This change in potential is reflected by Vb (pixel voltage) at point B shown in FIG. 2 through a buffer circuit.

The scanning line selection time Tg is 22 microseconds. For a PCLCD having 1024×768 pixels, the optical response (transmissivity) during the period is 501. It saturates about 100 microseconds afterward. One can maintain a predetermined value determined by the buffer output voltage which corresponds to the signal voltage.

As described, the time required for a liquid crystal indication to change from black to white is about 100 microseconds. This is much faster than several tens of miliseconds which is normal for a TN-type liquid crystal. Therefore, a crisp motion picture of high-image quality can be obtained. The time required for transition is short even if the number of pixels is increased, providing a high-quality image which a liquid crystal can inherently provide.

FIG. 7 includes an example of transmissivity using a generic active matrix circuit of conventional technology. As is apparent from the figure, an excellent transmissivity cannot be obtained. The field which changes from black to white indication changes its state for a time period, demonstrating a poor contrast. Various factors such as variance in applied voltage, a gap in the liquid crystal layer, and temperature distribution within the plane, affect transmissivity. This creates image defects providing a poor quality. Therefore, when there are a number of pixels and the pixel selection period is shorter than the liquid crystal response, an extremely poor image quality is obtained.

When Vc, the control signal, reaches a low level after Tc, the time period, Vb, the pixel voltage changes to some extent. The amount of change is determined by the following ratios:

the capacitance between the gate/source capacitance of transistor 206 (see FIG. 2) and the gate/drain capacitance of transistor 205, and the capacitance of liquid crystal layer 207 and storage capacitor 212.

A liquid crystal with a large effective permittivity such as an anti-ferroelectric liquid crystal has a large capacitance, therefore storage capacitor 212 is not always required. However, it is desirable that the circuit is designed to have a small voltage deviation including storage capacitor 212.

Note that a liquid crystal can respond to fast motion pictures if Tc, during which Vc (control signal) becomes a high voltage, is defined as the period of time during which the transmissivity of the liquid crystal reaches 70% or more. If one sets Tc to a short period of time with respect to the time required for the liquid crystal to respond to motion pictures, apply a positive voltage repeatedly several times, then, apply a negative voltage repeatedly for several fields, rather than applying positive/negative voltage alternately to the liquid crystal layer for each of the fields. In this way, the liquid crystal reaches the state in which a block of several fields reaches a predetermined transmissivity.

Figure 8:
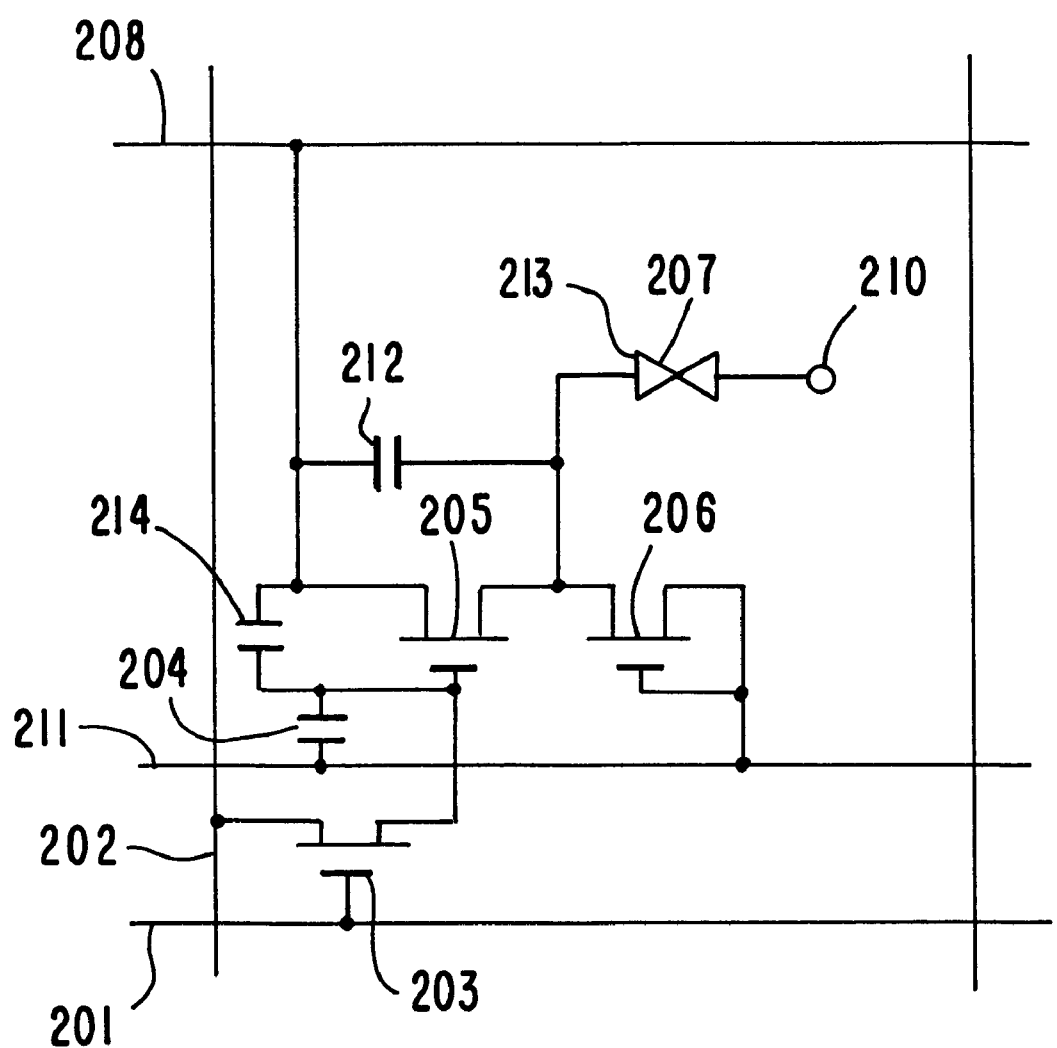
FIG. 8 is a circuit diagram showing Embodiment 3 of the present invention.
Figure 9:
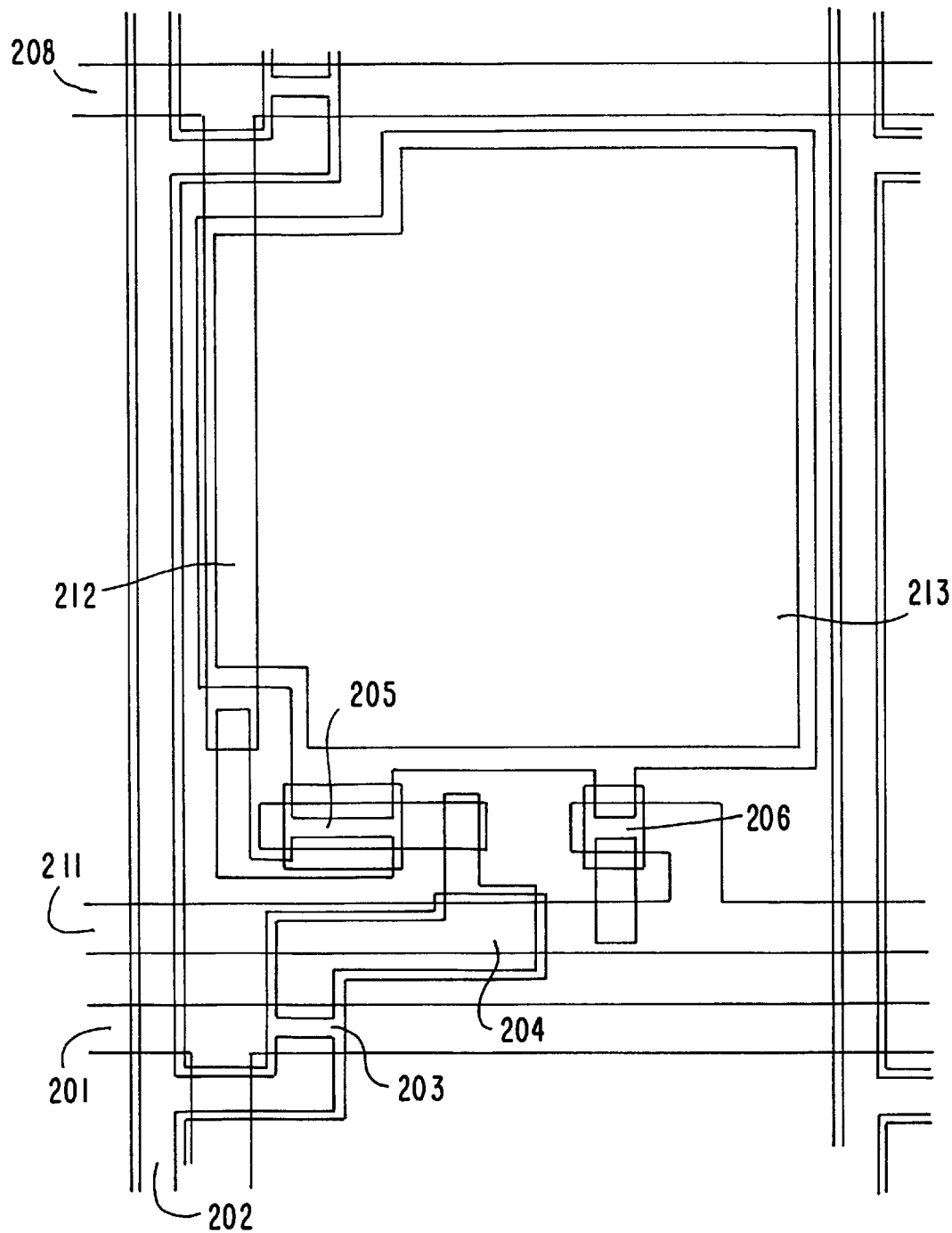
FIG. 9 is a circuit diagram in which the circuit shown in FIG. 8 is extended as a pixel circuit.

FIG. 8 is a circuit diagram showing Embodiment 3 of the present invention. FIG. 9 is a plan view of the circuit shown in FIG. 8 which is fabricated on a substrate. The features which are substantially equal to or correspond to those of Embodiment 2 shown in FIG. 3 are identified by the same numerals. In FIG. 9, holding capacitor 214 shown in FIG. 8 is not illustrated.

It can be seen that this embodiment has one control line 211 used as a common interconnect for the control signal (Vc) supply and the power voltage (Vdd) supply. Because of this configuration, one end of storage capacitor 212 is connected to pixel electrode 213 and the other end of capacitor 212 is connected to the Vss side, that is over scanning line 208. With this configuration, the possibility that voltage change in the control line changes the pixel voltage can be reduced through storage capacitor 212. Having one interconnect less than normal, the opening ratio improves. This is another advantageous effect. With the improvement of opening ratio, the light utilization efficiency can be directly improved, providing a bright screen.

FIGS. 10 through 13 show circuit diagrams representing Embodiments 4 through 7 of the present invention. The elements which are substantially equal to or correspond to those shown in Embodiment 2 of FIG. 3 are identified by the same numerals.

Figure 10:
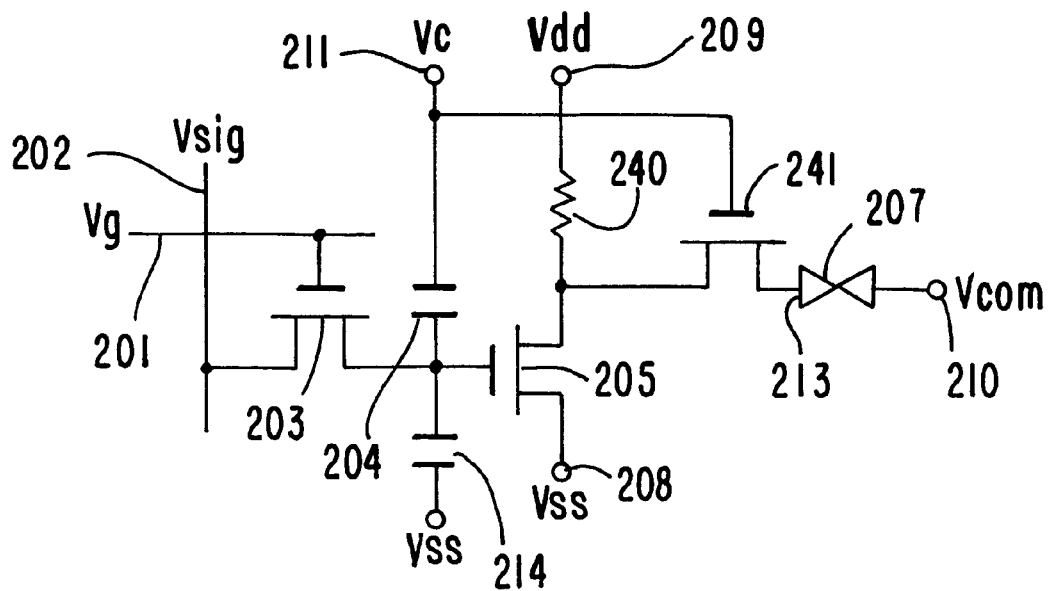
FIG. 10 is a circuit diagram showing Embodiment 4 of the present invention.

In Embodiment 4 shown in FIG. 10, resistor 240 and transistor 241 are formed. By loading resistivity, the pixel voltage can start up faster; this provides a faster transmissivity.

Figure 11:
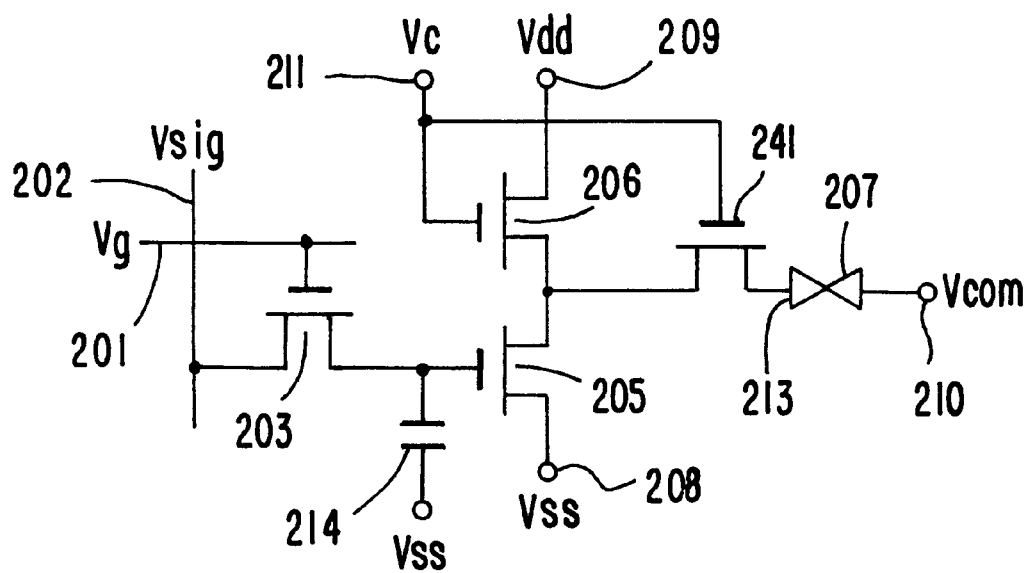
FIG. 11 is a circuit diagram showing Embodiment 5 of the present invention.

In Embodiment 5 shown in FIG. 11, the gates of transistors 206 and 241 are connected to control line 211. A predetermined effect is obtained by turning them on. The pixel voltage can be held by transistor 241 regardless of the state of the buffer circuit.

Figure 12:
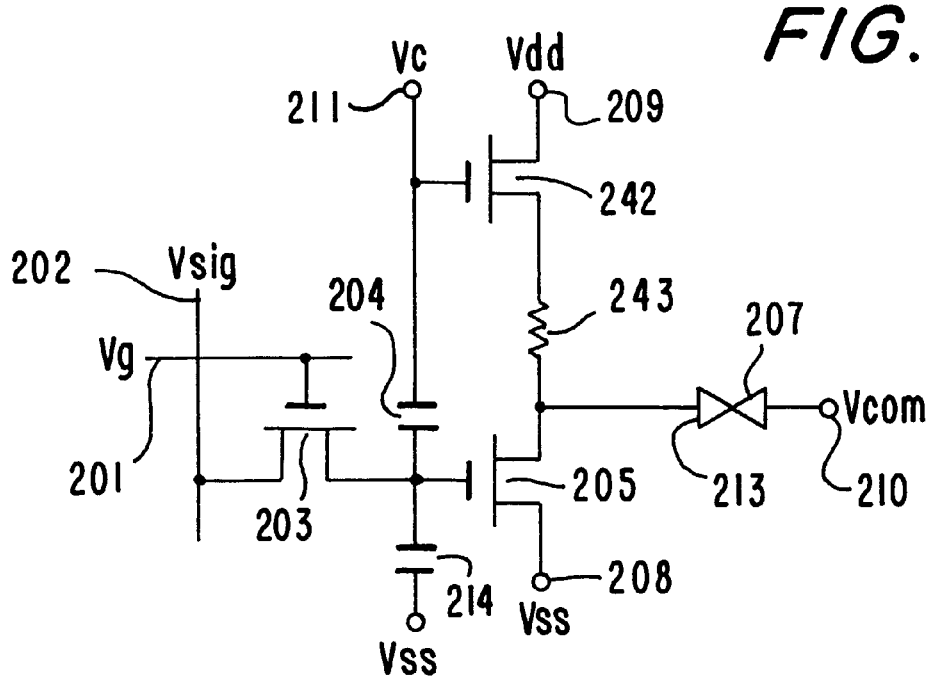
FIG. 12 is a circuit diagram showing Embodiment 6 of the present invention.

In Embodiment 6 shown in FIG. 12, transistor 242 and resistor 243 are formed. Transistor 242 is turned on/off by means of control signal (Vc) applied to control line 211.

Figure 13:
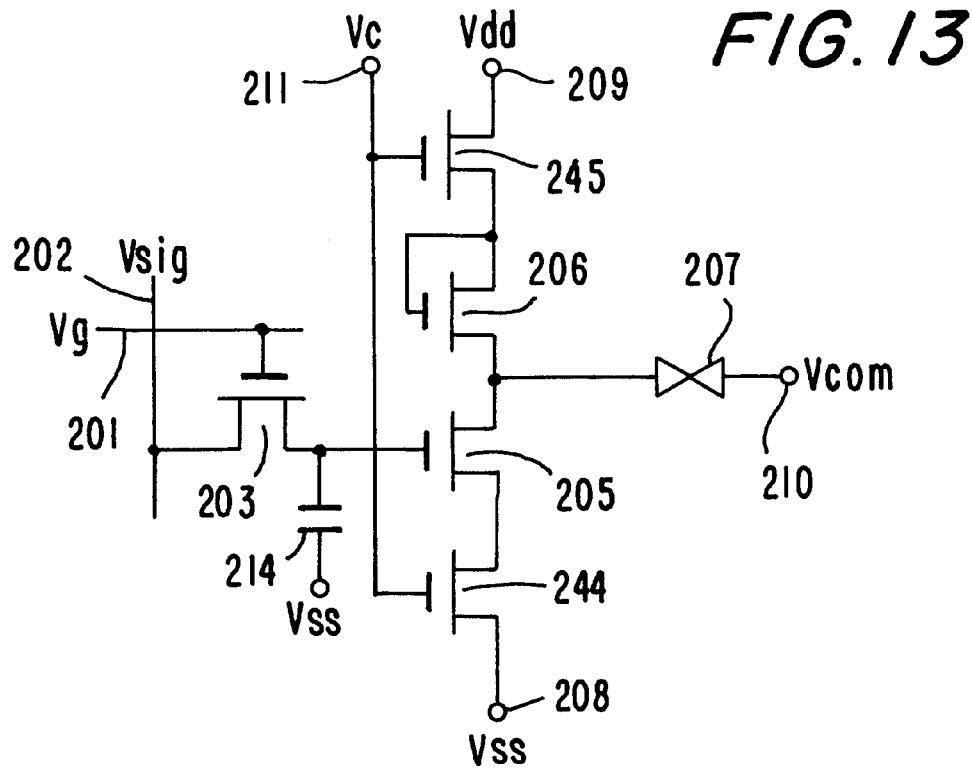
FIG. 13 is a circuit diagram showing Embodiment 7 of the present invention.

In Embodiment 7 shown in FIG. 13, transistors 244 and 245 are formed. Their conductive state is controlled by means of control signal (Vc) applied to control line 211 to change the conductive state between the buffer circuit and power sources 208 and 209.

Note that in Embodiments 4 through 7 shown in FIGS. 10 through 13, a storage capacitance is not formed for the output of the buffer circuit; however, a storage capacitance can be formed as in Embodiment 3.

In each of the embodiments described above, a power source line, which supplies power source voltage (Vss), can be connected to the other scanning line before it, or it can be formed independently. By forming the power source line independently, the load on the scanning line can be reduced, thus suppressing the scanning pulse propagation delay. The p-type transistor can be used in place of the n-type transistor. If the voltage relationships are adjusted appropriately, both the n-type and the p-type CMOS buffer circuit etc. can be used together.

In a liquid crystal display which uses liquid crystals such as the TN-type, the liquid crystal needs to be driven by an alternating current at a frequency (e.g., about 60 Hz) to avoid noticeable flicker. Therefore, the liquid crystal is driven by the alternating current even when the image display remains the same. Unnecessary power is consumed, which is a problem. Embodiments described below intend to resolve this problem.

Figure 14:
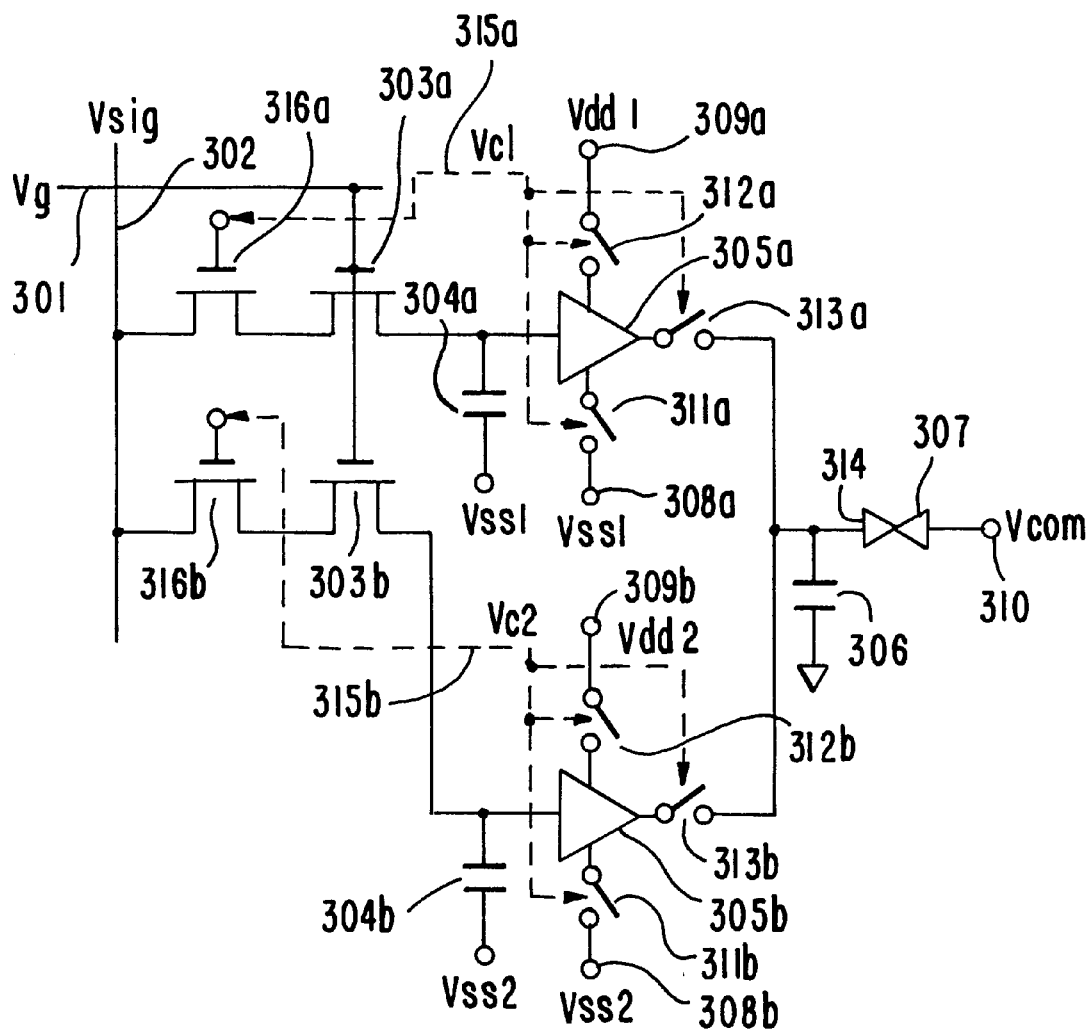
FIG. 14 is a circuit diagram showing Embodiment 8 of the present invention.

FIG. 14 is a circuit diagram showing a pixel unit of a liquid crystal display apparatus of Embodiment 8 of the present invention.

A scanning line 301, supplies scanning signal (Vg) to the gates of transistors 303a and 303b. A signal line 302, supplies signal (Vsig) which determines whether or not the pixel should be on, is connected to transistors 316a and 316b. At the output side of transistors 303a and 303b, holding capacitors 304a and 304b are connected to hold the signal voltage.

The voltage held at holding capacitors 304a and 304b is applied to analog buffer circuits 305a and 305b to obtain output voltages which correspond to the respective input voltages. A liquid crystal layer 307 is connected to the output side of buffer circuits 305a and 305b via pixel electrode 314. A voltage is applied to liquid crystal layer 307 between pixel electrode 314 and facing electrode 310 (Vcom). Also, storage capacitor 306, which stabilizes the voltage applied to the liquid crystal layer 307 is connected to pixel electrode 314.

A power source voltage is supplied to respective buffer circuits 305a and 305b from the following:

power source lines 308a (Vss1) and 309a(Vdd1), power source line 308b (Vss2), and power source line 309b (Vdd2).

Switches 311a, 311b, 312a, 312b whose resistivity can be changed, are respectively formed between each of the power source lines and between each of the buffer circuits. Also, switches 313a and 313b are respectively formed between the output of buffer circuit 305a and the pixel electrode 314 and between the output of buffer circuit 305b and the pixel electrode 314. Each of the switches are controlled by control signals (Vc1 and Vc2) supplied from control lines 315a and 315b. In addition, control lines 315a and 315b are respectively connected to the gates of transistor 316a and 316b. Their conductive state is controlled by means of control signals (Vc1 and Vc2).

Viewing the configuration as an equivalent circuit, it is acceptable if at least one of the following is formed:

a set of switches 311a, 312a, which shuts off the power supply to buffer circuit 305a, and a single switch 313a, which provides a high resistivity between buffer circuit 305a and liquid crystal layer 307.

Switches 311a, 312a, and 313a are independent from buffer circuit 305a. Also, switches 311b through 313b are independent from buffer circuit 305b in the example shown in FIG. 14. However, they can be included in buffer circuits 305a and 305b. In short, it is acceptable if the circuit is configured such that the conductive state (high resistivity or low resistivity) between the output of buffer circuit 305a and pixel electrode 314 and that between buffer circuit 305b and pixel electrode 314 are controlled by means of control signals (Vc1 and Vc2) supplied from control lines 315a and 315b.

How the circuit shown in FIG. 14 operates is described with reference to the timing chart shown in FIG. 15.

During the period in which the scanning signal (Vg) of scanning line 301 maintains a high voltage, transistors 303a and 303b are turned on. During the period in which control signal (Vc1) of control line 315a maintains a high voltage, transistor 316a is turned on. During the period in which control signal (Vc2) maintains a high voltage, transistor 316b is turned on.

During the period in which transistors 303a and 316a are both turned on, holding capacitor 304a is charged with signal voltage (Vsig) from signal line 302. After the selection period, the voltage of scanning line 301 reaches a low voltage. Transistor 303a becomes nonconductive, (high-resistivity state) and the voltage is held by holding capacitor 304a. On the other hand, control signal (Vc1) turns on (closes)switches 311a through 313a for a predetermined period of time to apply the output from buffer circuit 305a to pixel electrode 314.

Figure 15:
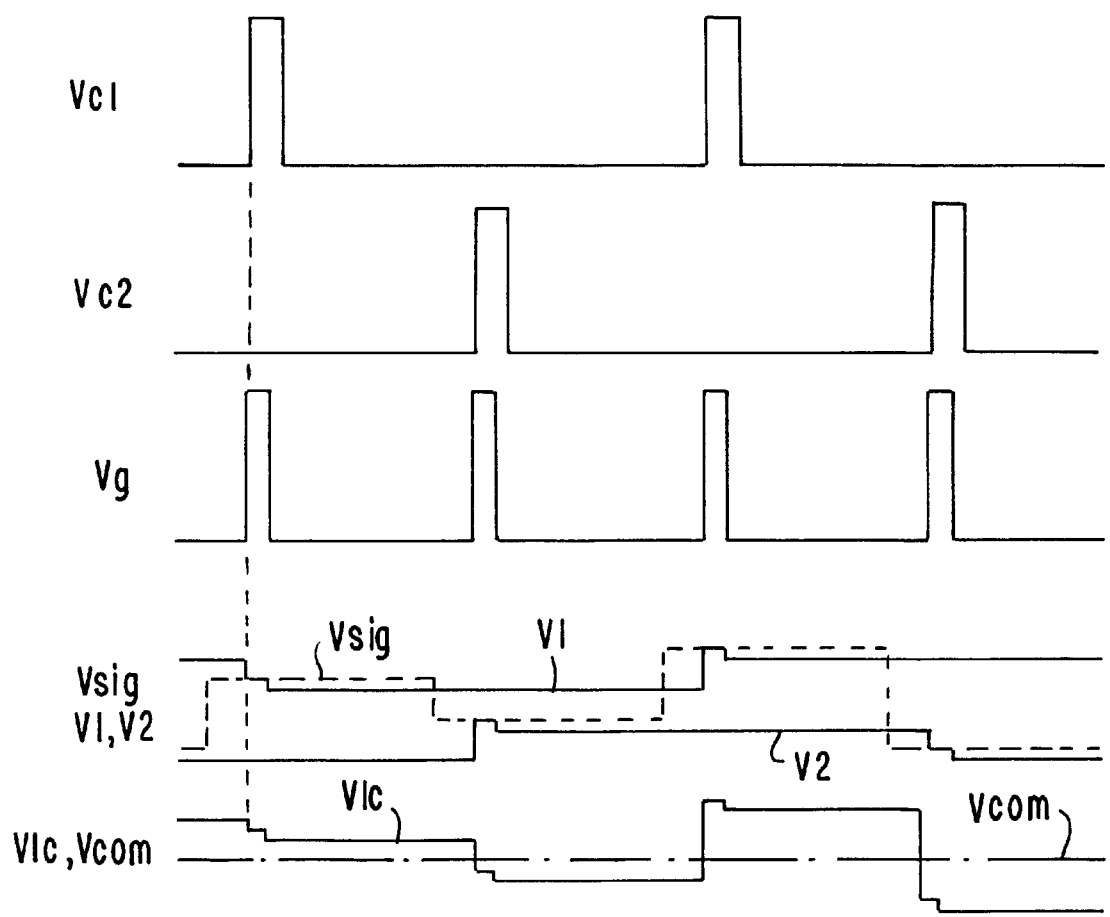
FIG. 15 shows graphical waveforms indicating the change in voltage and optical response (transmissivity) with time for Embodiment 8.

Each of the positive and negative signal voltages which corresponds to the positive and negative image signals can be held at holding capacitors 304a and 304b by supplying control signals (Vc1 and Vc2) at different time frames as shown in FIG. 15. When the same image is maintained, alternating current can be continuously applied to liquid crystal layer 307, even if scanning line 301 is stopped, as long as the supply of control signals (Vc1 and Vc2) continues at a predetermined cycle and the positive and negative signal voltages are held by and provided by capacitors 304a and 304b.

Compared to the cycle of scanning signal (Vg), the cycle of control signals (Vc1 and Vc2) can be shorter, thus substantially reducing the power consumption of the drive circuit. Of course, if a material is used which greatly changes the equivalent permittivity (or amount of polarization) the required voltage can be applied independently from the pixel selection period. With excellently fast response, a high-quality image including contrast can be obtained in the same manner as in Embodiment 1 shown in FIG. 1.

Figure 16:
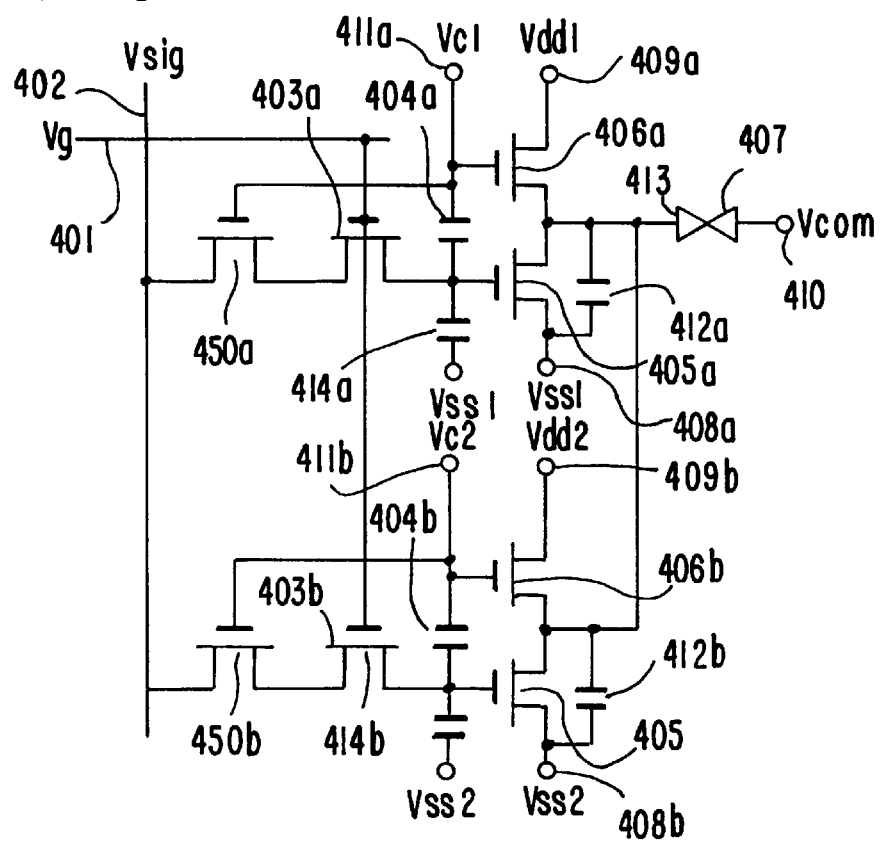
FIG. 16 is a circuit diagram showing Embodiment 9 of the present invention.

FIG. 16 is a circuit diagram showing a unit of pixel construction of a liquid crystal system of Embodiment 9.

A scanning line 401, signal line 402, and transistors 403a, 403b, 450a, and 450b are configured in the same manner as their equivalents in FIG. 14. The output of transistor 403a is connected to holding capacitors 404a and 414a. The output of transistor 403b is connected to holding capacitors 404b and 414b. However, holding capacitors 414a and 414b are not always required. A buffer circuit is constructed by transistors 405a and 406a. The other buffer circuit is configured with transistors 405b and 406b. The outputs of each of the buffer circuits are connected to pixel electrode 413 such that a voltage can be applied to liquid crystal layer 407 between facing electrode 410 (Vcom) and pixel electrode 413. Storage capacitors 412a and 412b are connected to each of the outputs of the buffer circuits.

The gates of transistor 406a and 406b are respectively controlled by control signals (Vc1 and Vc2) from respective control lines 411a and 411b. In the same manner as in Embodiment 2, the gates of transistors 405a and 405b are respectively controlled by means of control signals (Vc1 and Vc2) via capacitors 404a and 404b.

Note that in FIG. 16, power supply line 408a (power supply voltage Vss1) and power supply line 408b (power supply voltage Vss2) are separated but they can be the same line. Also, voltage Vc1 of control line 411a can be used for voltage Vdd1 of power supply line 409a. Voltage Vc2 of control line 411b can be used for voltage Vdd2 of power supply line 409b. It is also possible that another scanning line before the present one can be used as power supply lines 408a and 408b.

Figure 17:
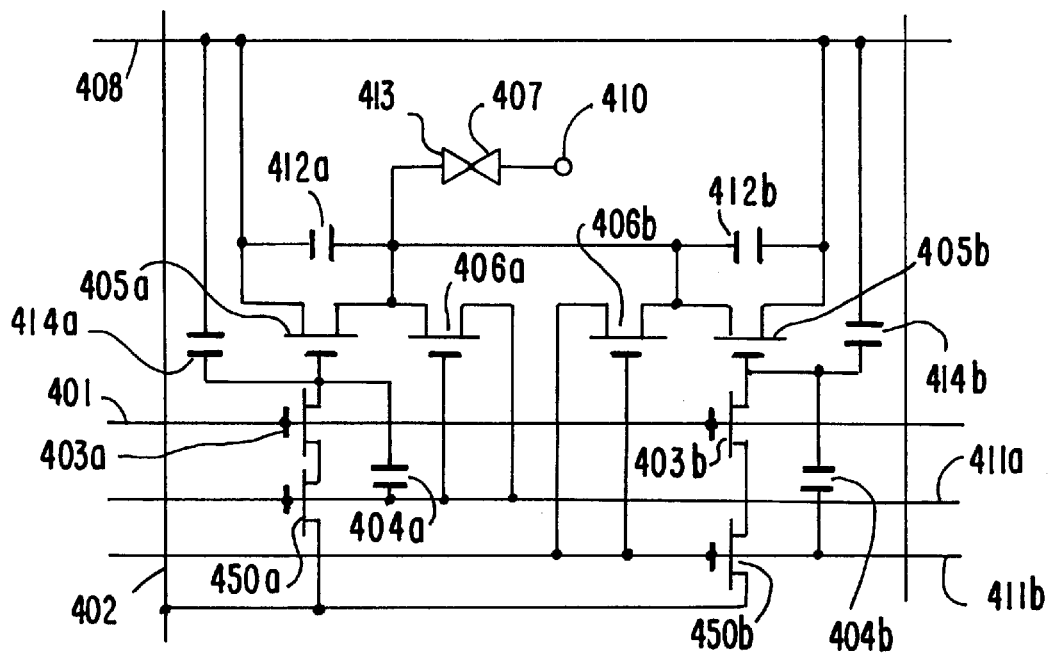
FIG. 17 is a circuit diagram in which the circuit shown in FIG. 16 is extended as a pixel circuit.
Figure 18:
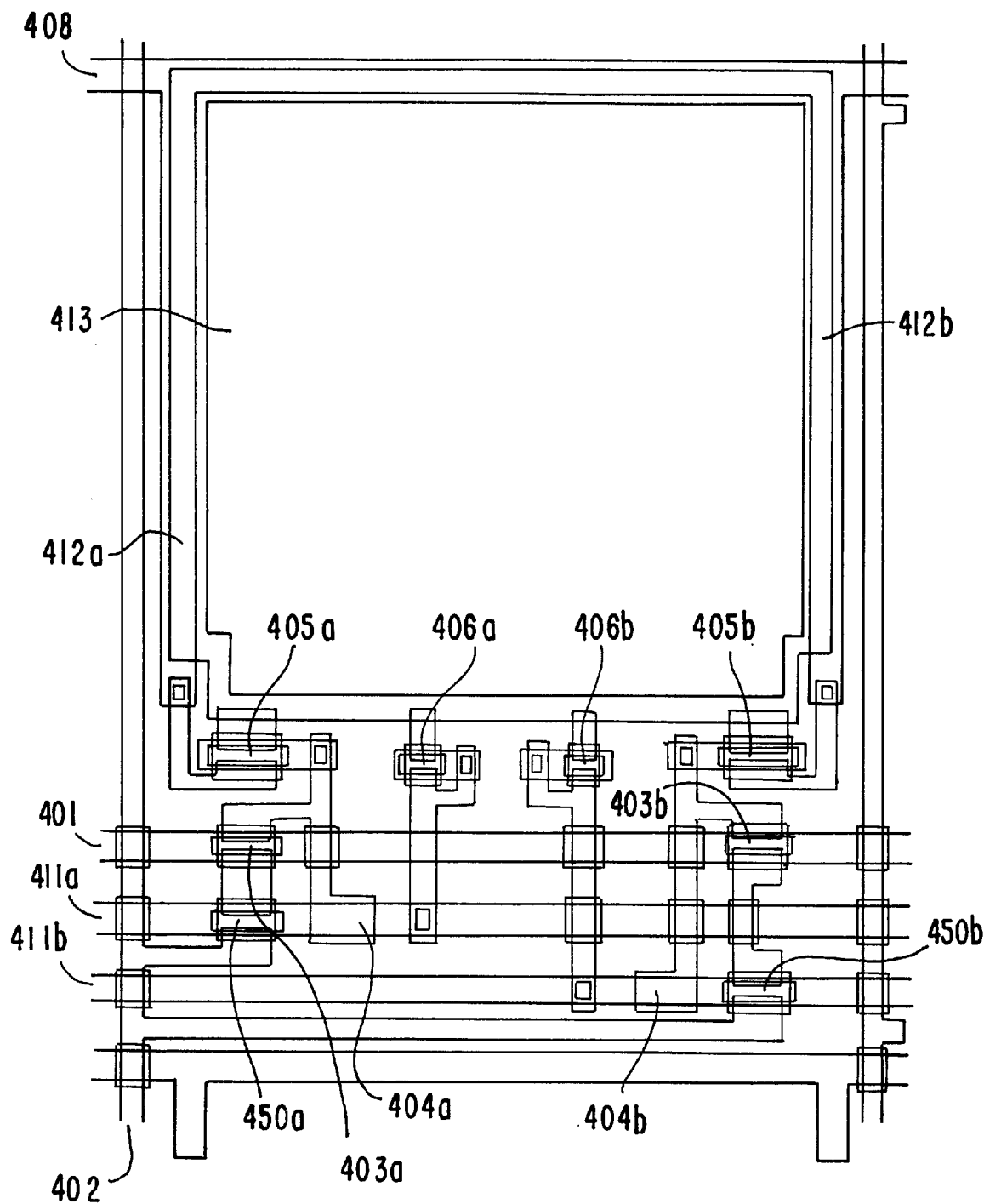
FIG. 18 is a plan view of the circuit shown in FIG. 17 fabricated on a substrate.

FIG. 17 is an example of the circuit shown in FIG. 16 which is extended as a pixel circuit. FIG. 18 is a plan view of the circuit shown in FIG. 17 which is fabricated on a substrate. In FIG. 18, holding capacitors 414a and 414b, which are shown in FIG. 17, are not illustrated.

In this example, the power source line of power source voltage Vdd1 is shared with control line 411a. The power source line of power source voltage Vdd2 is shared with control line 411b. In addition, power source voltage Vss1 and Vss2 uses voltage Vss to serve the purpose of making power source line 408 independent.

When using an amorphous silicon TFT having transistors with a threshold voltage (Vth) of 3V and a signal voltage of 4V to 11V, the pixel voltage was provided with a voltage difference of 3V to 13V where Vc1 and Vc2 (high voltage state)=30V;

Vss=−5V; and

βr=3.

Also, when facing electrodes had a voltage of 8V applied thereto, a screen with little flicker was obtained. The buffer circuit did not demonstrate a linearity of input/output within the above input voltage range. However, when the signal voltages were corrected based on their own properties, an excellent display was obtained without any problem.

Even when the scanning line driving was stopped after writing the positive and negative signals, a display was maintained for a predetermined period of time according to the voltage change in holding capacitance due to the TFT leak and the like. For example, a display was maintained without recognition of overwriting, even though the display was overwritten about every minute when light was not sufficiently shielded for the TFT used for a liquid crystal display apparatus of the reflective type. The display was overwritten about every 5 seconds in a liquid crystal display apparatus of a transmissive type.

It can be assumed that the same circuit configuration as Embodiment 2 shown in FIG. 2 and the like was used for the positive and negative signals in this embodiment. It is also acceptable that the same circuit configurations as the ones shown in FIGS. 3 through 7 may be used.

Figure 19:
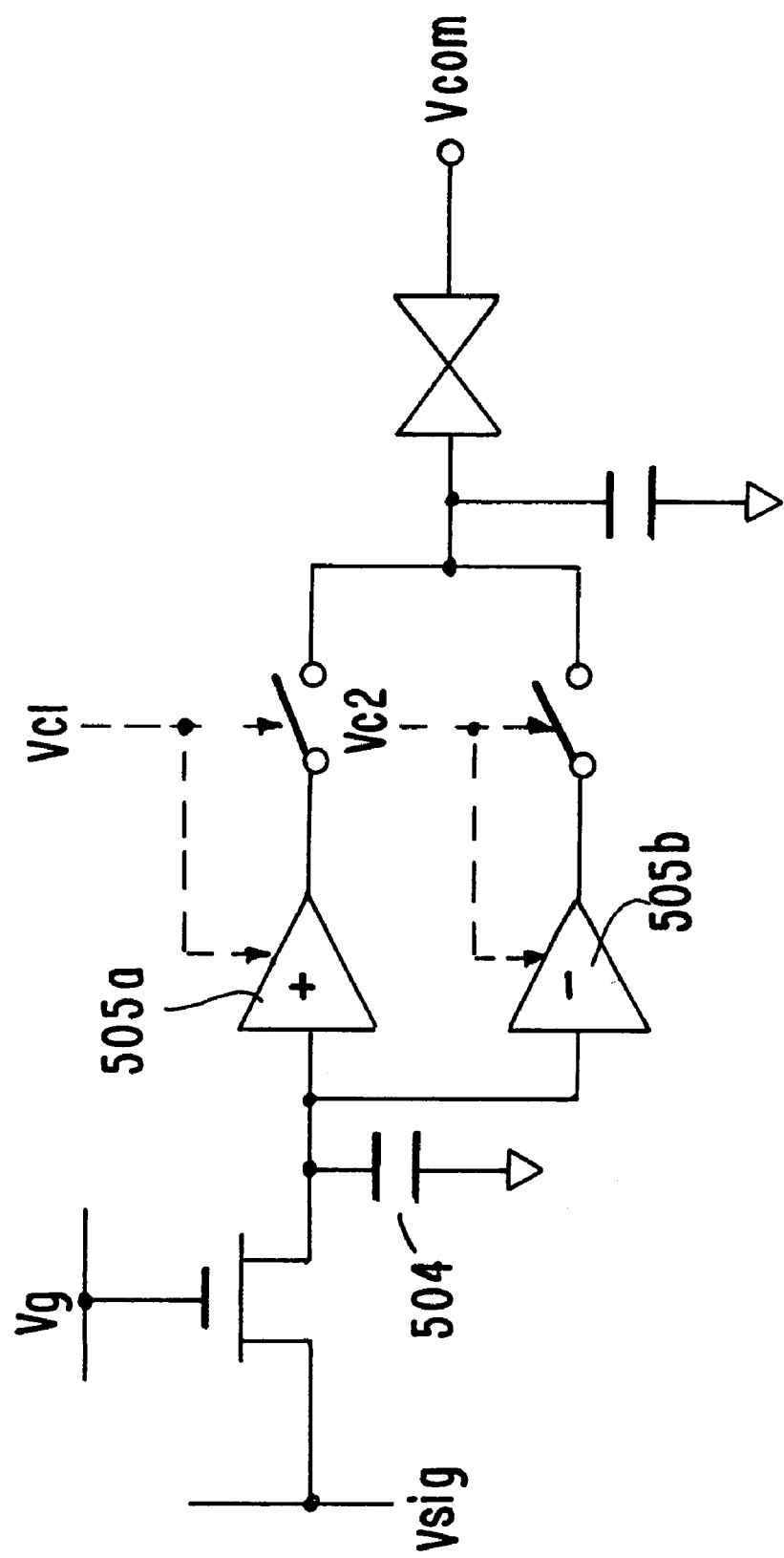
FIG. 19 is a circuit diagram showing Embodiment 10 of the present invention.

FIG. 19 is a circuit diagram showing a unit of pixel construction of a liquid crystal system of Embodiment 10 of the present invention.

In this embodiment, a voltage is held using a holding capacitor 504. Buffer circuits 505a and 505b are formed to generate the positive and negative voltages according to the holding voltage. The output from buffer circuits 505a and 505b are respectively switched by means of control signals (Vc1 and Vc2). With this configuration, the signal voltage can be of one polarity with a small voltage amplitude.

Figure 21:
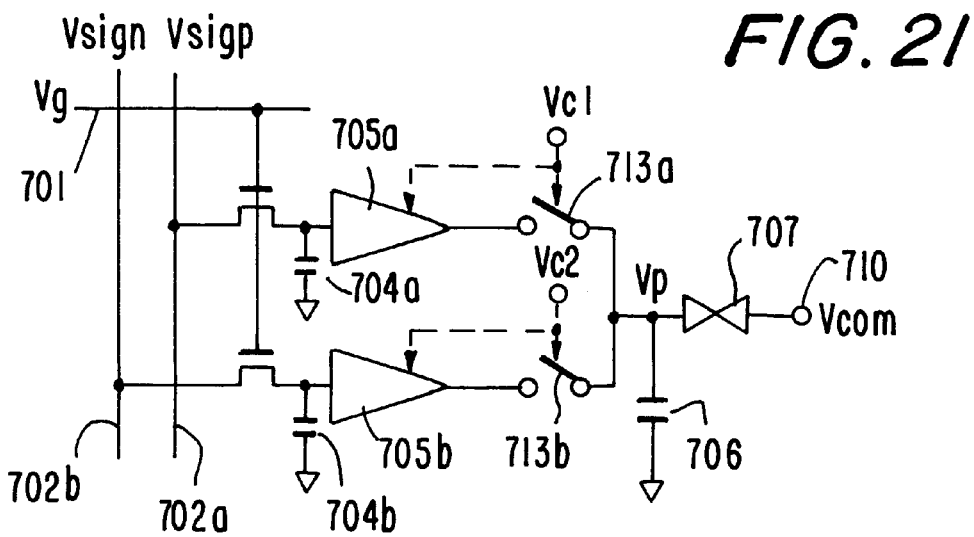
FIG. 21 is a circuit diagram showing Embodiment 11 of the present invention.

FIG. 21 is a circuit diagram showing a unit of pixel construction of a liquid crystal system of Embodiment 11 of the present invention.

Embodiment 11 has signal lines which are divided into positive signal line 702a (Vsigp) and negative signal line 702b (Vsign). With this configuration, the positive and negative signals can be applied, respectively, to both buffer circuits 705a and 705b simultaneously at the high level time of scanning line 701 (Vg). Control signals (Vc1 and Vc2) are the same as those shown in FIG. 19. They turn on one of the buffer circuits 705a and 705b to apply the voltage to the liquid crystal.

We can prepare two scanning lines for giving input signal to buffer circuit 705a, 705b each other.

Figure 22:
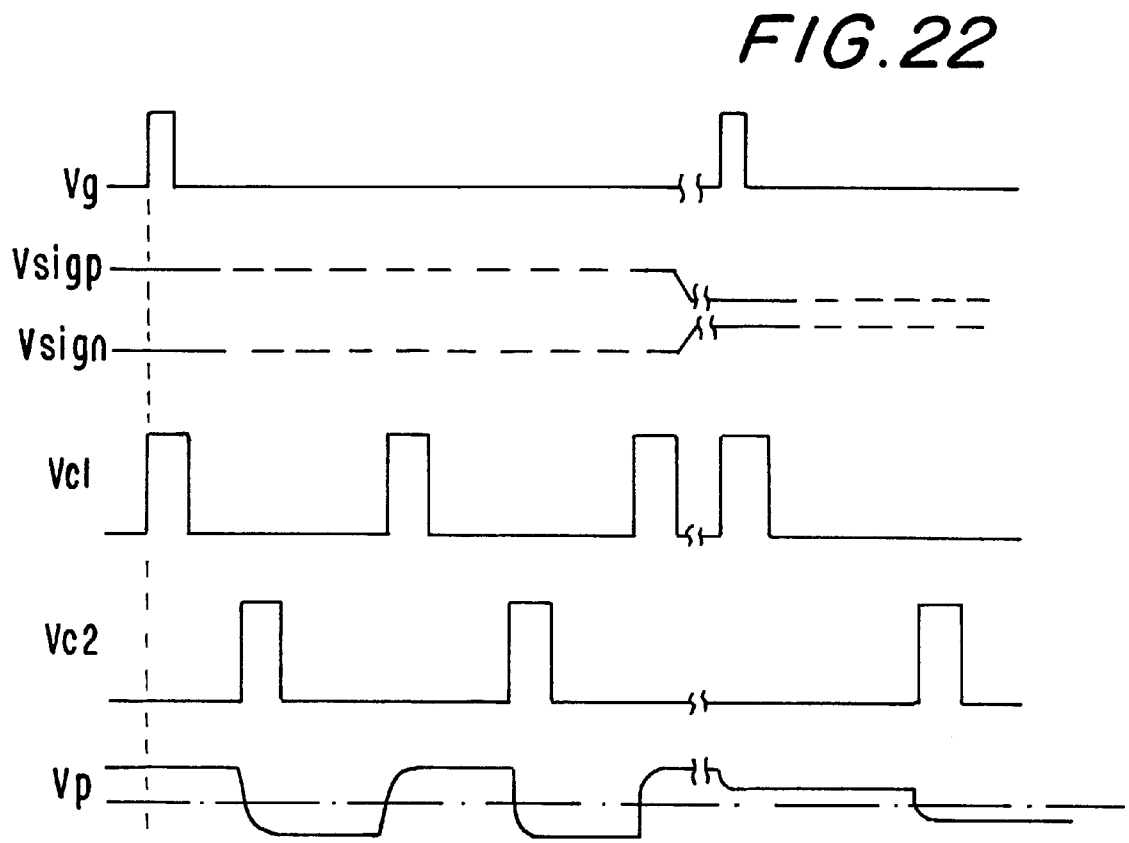
FIG. 22 shows graphical waveforms indicating the change in voltage and optical response (transmissivity) with time for Embodiment 11.

FIG. 22 is a diagram showing each of the voltage wave profiles of this embodiment. It is clear that alternate signals are applied to the liquid crystal by the cycle of control signals (Vc1 and Vc2) after a predetermined signal voltage is sampled by the scanning line pulse. It is possible to unify the control signals and switch the connection condition (on/off) of the liquid crystal and the two buffer circuits. With this configuration, an image signal can be saved with the one-time sampling, thus reducing the time required for writing. This can reduce the power consumption by half during writing.

Figure 20:
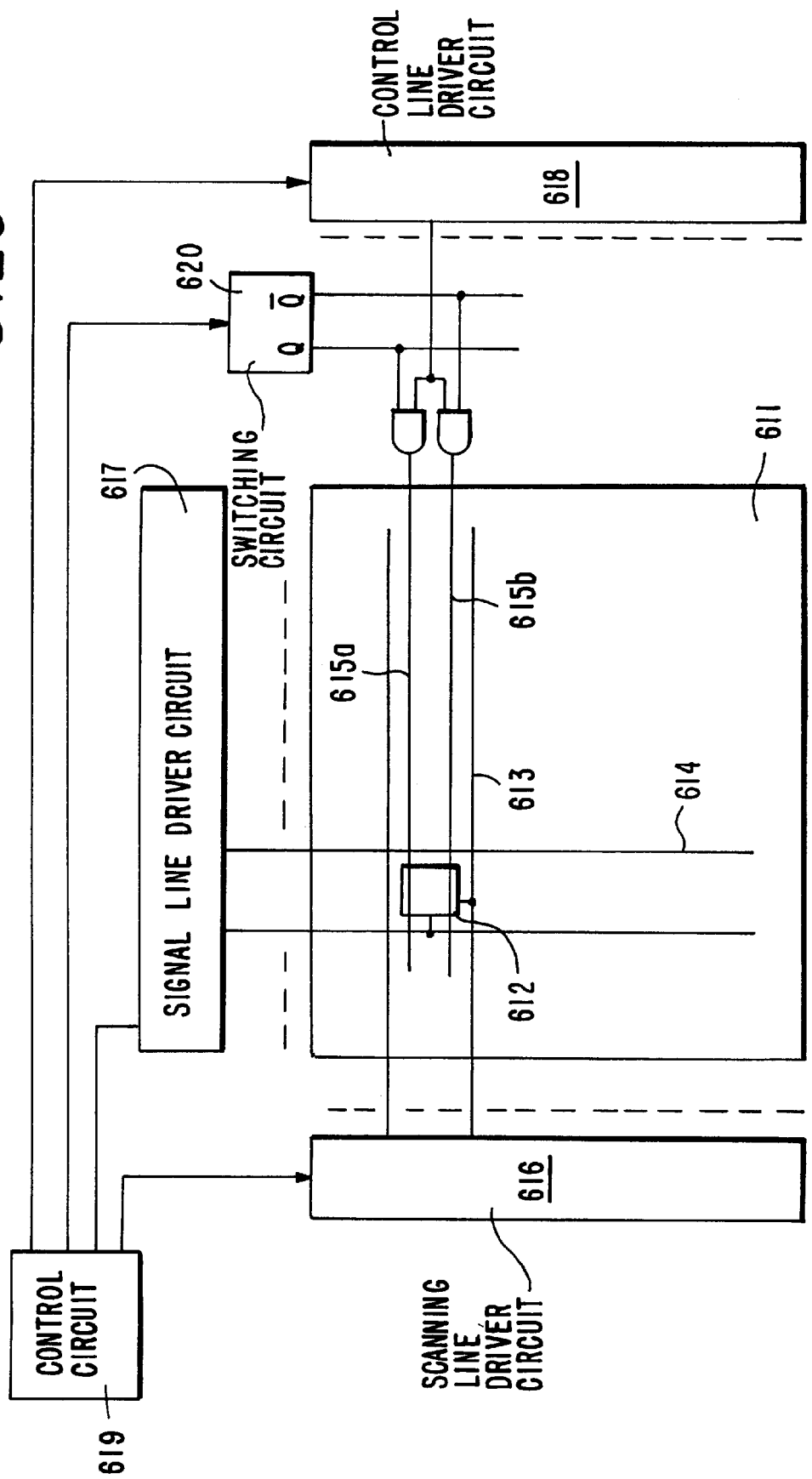
FIG. 20 is a block diagram showing a liquid crystal panel and its drive circuit for Embodiments 8 through 10.

FIG. 20 is a block diagram showing a configuration of a liquid crystal panel and its drive circuit and the like. Identified by numeral 611 is a liquid crystal cell, 612 is a pixel portion, 613 is a scanning line, 614 is a signal line, 615a and 615b are control lines, 616 is a scanning line driver circuit, 617 is a signal line driver circuit, 618 is a control line driver circuit, 619 is a control circuit, and 620 is a switching circuit, which switches control signals. How they are operated is not further described here because such operation is clear by reference to the normal line sequence for active matrix driving and the timing chart and the like shown in FIG. 15.

In the above Embodiments 8 and 9, a p-type transistor may be used in place of the n-type transistor. In addition, if the voltage relationship is adjusted appropriately, the n-type and p-type transistors may be used together in the same circuit.

In each of the above embodiments, the following liquid crystal materials may be used besides anti-ferroelectric liquid crystal:

ferroelectric liquid crystal;

cholesteric liquid crystal;

polymer dispersion-type liquid crystal (PDLC);

TN liquid crystal; and microcapsule-covered liquid crystal.

The apparatus incorporating the principles of the present invention can apply a desired voltage to a liquid crystal layer for a longer time than the scanning period. Therefore, the liquid crystal can respond to the voltage quickly, thus protecting the display performance. Also, the apparatus incorporating the principles of the present invention can maintain a high impedance of the pixel electrode, thus reducing power consumption.

In addition, by forming a plurality of voltage supply means, a liquid crystal can be driven by alternating current without supplying a scanning signal or a display signal when the same display image is kept. This helps to reduce unnecessary power consumption.

Various modifications will become possible for those skilled in the art after receiving the teachings of the present disclosure without departing from the scope thereof.

What is claimed is:

1. A liquid crystal display apparatus comprising:

a plurality of pixel portions;

a plurality of scanning lines coupled to said pixel portions for supplying scanning signals to the plurality of pixel portions;

a first substrate having a plurality of signal lines for supplying display signals to said plurality of pixel portions;

a second substrate facing said first substrate;

a liquid crystal layer arranged between said first substrate and said second substrate;

means for applying an electromagnetic field to said liquid crystal layer at positions corresponding to selected pixel portions; wherein each of said pixel portions comprises:

a switching element including a first N-channel MOSFET transistor a first capacitor coupled to the drain of said first transistor for holding a display signal voltage supplied from a signal line via said switching elements;

a second N-channel MOSFET transistor having a source and drain and having a gate coupled to said first capacitor;

a third N-channel MOSFET transistor having a gate and having a source and drain, said source of said third transistor being coupled to the drain of said second transistor;

a second capacitor coupled between the gate of said second transistor and the gate of said third transistor;

a pixel electrode coupled to said liquid crystal layer and to one of said source or drain of said second transistor and the source or drain of said third transistor for supplying said display signal voltage held by said first capacitor; and voltage supply control means for controlling the impedance of said pixel electrode whereby when said second and third transistors are in conducting condition and said display signal voltage applied to said pixel electrode reaches a predetermined voltage, said voltage supply control means causes said second and third transistors to stop conducting.

2. Apparatus, as claimed in claim 1, wherein said voltage supply control means places said pixel electrode into a low-impedance state for a predetermined period to supply said display signal voltage to said liquid crystal layer and then places said pixel electrode into a high-impedance state.

3. Apparatus, as claimed in claim 1, wherein said voltage supply control means supplies said display signal voltage to said pixel electrode by maintaining said second and third transistors in a conductive state for a predetermined time period and then changes the state of said second and third transistors into a nonconductive state.

4. Apparatus, as claimed in claim 3, wherein said voltage supply control means changes said second and third transistors from a conductive state to a non-conductive state by changing the voltage applied to said gate of said second transistor via the voltage applied to said gate of said third transistor and said second capacitor.

5. Apparatus, as claimed in claim 1, wherein said liquid crystal layer is formed of liquid crystal with spontaneous polarization.

6. A liquid crystal display apparatus for supplying a display signal voltage to a liquid crystal layer, said apparatus comprising:

supply means for supplying display signal voltage;

a plurality of pixel portions coupled to said supply means and to said liquid crystal layer for applying display signal voltage to said layer;

each of said pixel portions including switching means including a first N-channel MOSFET transistor coupled to said supply means, holding means including a first capacitor coupled to the drain of said first transistor for holding said display signal voltage supplied via said switching means, voltage supply means including a buffer amplifier and a pixel electrode coupled to said liquid crystal layer for supplying a voltage corresponding to said display signal voltage held by said holding means, said buffer amplifier including at least two N-channel MOSFET transistors operable between conducting and non-conducting conditions and control means for controlling the impedance of said pixel electrode to supply the display signal voltage to said liquid crystal layer for preselected time periods whereby when said two buffer amplifier transistors are in conducting condition and said display signal voltage reaches a predetermined voltage, said control means causes said two buffer amplifier transistors to stop conducting.

7. Apparatus, as claimed in claim 6, wherein said liquid crystal layer is formed of liquid crystal with spontaneous polarization.

8. A liquid crystal display apparatus comprising:

a plurality of pixel portions;

a plurality of scanning lines coupled to said pixel portions for supplying scanning signals to said plurality of pixel portions;

a first substrate having a plurality of signal lines for supplying display signals to said plurality of pixel portions;

a second substrate facing said first substrate;

a liquid crystal with spontaneous polarization layer arranged between said first substrate and said second substrate;

means for applying an electric field to said liquid crystal layer at positions corresponding to selected pixel portions; wherein each of said pixel portions comprises:

switching means including a first N-channel MOSFET transistor coupled to said signal lines;

holding means including a first capacitor coupled to the drain of said first transistor of said switching means for holding a display signal voltage supplied from said signal line via said switching means;

voltage supply means including a buffer amplifier having a second and third N-channel MOSFET transistor coupled to said liquid crystal layer for supplying a voltage corresponding to the display signal voltage held by said holding means; voltage supply control means for controlling the impedance of said buffer amplifier; and a pixel electrode coupled to the output of said voltage supply means whereby when said second and third transistors are conducting and said display signal voltage reaches a predetermined voltage, said voltage supply control means causes said second and third transistors to stop conducting.

9. A liquid crystal display apparatus comprising:

a plurality of pixel portions;

a plurality of scanning lines coupled to said pixel portions for supplying scanning signals to said plurality of pixel portions;

a first substrate having a plurality of positive signal lines and negative signal lines for supplying display signals to said plurality of pixel portions;

a second substrate facing said first substrate;

a liquid crystal layer arranged between said first substrate and said second substrate;

means for applying an electric field to said liquid crystal layer at positions corresponding to selected pixel portions; wherein each of said pixel portions comprises:

a plurality of buffer circuits including switching means operable between conducting and non-conducting conditions coupled to said positive signal lines and negative signal lines;

holding means coupled to said switching means for holding a display signal voltage supplied from said signal line via said switching means;

voltage supply means coupled to said liquid crystal layer for supplying a voltage corresponding to the display signal voltage held by said holding means;

a pixel electrode coupled to the output of said voltage supply means; and control means coupled to said buffer circuits and said voltage supply means for controlling the output impedance of said voltage supply means whereby when said switching means is in a conducting condition and said display signals reach a predetermined level, said control means switches said switching means to a non-conducting condition.

10. A liquid crystal display apparatus comprising:

a plurality of pixel portions;

a plurality of scanning lines coupled to said pixel portions for supplying scanning signals to said plurality of pixel portions;

a first substrate having a plurality of signal lines for supplying display signals to said plurality of pixel portions;

a second substrate facing said first substrate;

a liquid crystal layer arranged between said first substrate and said second substrate;

means for applying an electric field to said liquid crystal layer at positions corresponding to selected pixel portions; wherein each of said pixel portions comprises:

switching means having a first N-channel MOSFET transistor with a source coupled to said signal lines;

holding means including a first capacitor coupled to said drain of said first transistor for holding a display signal voltage supplied from said signal line via said switching means;

voltage supply means coupled to said liquid crystal layer for supplying a voltage corresponding to the display signal voltage held by said holding means;

a pixel electrode coupled to the output of said voltage supply means;

control means for controlling the output impedance of said voltage supply means, said output impedance being variable between minimum and maximum conditions and further comprising capacitance means connecting to the input of said voltage supply means, and said control means control said output impedance through said capacitance means whereby when said display signal voltage reaches a predetermined value, said control means changes said output impedance of said voltage supply means between its minimum and maximum conditions.

\* \* \* \* \*